US012717501B2

(12) United States Patent
Kohli et al.

(10) Patent No.: US 12,717,501 B2
(45) Date of Patent: Aug. 25, 2026

(54) GRAPH-BASED STORAGE MANAGEMENT

(71) Applicant: Microsoft Technology Licensing, LLC, Redmond, WA (US)

(72) Inventors: Jaspal Kohli, Sunnyvale, CA (US); Shwetashree Virajamangala, Cupertino, CA (US); Sudip Chandra Talukder, Bangalore (IN); Stimit Kishor Oak, San Jose, CA (US); Hari Krishna Mudaliar, Pleasanton, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 18/332,461

(22) Filed: Jun. 9, 2023

(65) Prior Publication Data

US 2023/0409215 A1 Dec. 21, 2023

(30) Foreign Application Priority Data

Jun. 14, 2022 (IN) ............................. 202241033908

(51) Int. Cl.
*G06F 3/06* (2006.01)
*G06F 11/07* (2006.01)

(52) U.S. Cl.
CPC .......... *G06F 3/0631* (2013.01); *G06F 3/0617* (2013.01); *G06F 3/0665* (2013.01); *G06F 3/067* (2013.01); *G06F 11/0793* (2013.01)

(58) Field of Classification Search
CPC ...... G06F 3/0631; G06F 3/0617; G06F 3/066; G06F 3/067; G06F 11/0793
See application file for complete search history.

(56) References Cited

U.S. PATENT DOCUMENTS 6,745,207 B2 * 6/2004 Reuter .................... G06F 12/08 718/1
7,363,457 B1 4/2008 Dekoning et al.
7,818,517 B1 10/2010 Glade et al.
10,540,288 B2 1/2020 Noureddine et al.
10,565,112 B2 2/2020 Noureddine et al.
10,659,254 B2 5/2020 Sindhu et al.
(Continued)

FOREIGN PATENT DOCUMENTS

EP 2821925 A1 1/2015

OTHER PUBLICATIONS

"International Search Report and Written Opinion Issued in PCT Application No. PCT/US23/068250", Mailed Date: Sep. 27, 2023, 12 Pages.

*Primary Examiner* — Kalpit Parikh
(74) *Attorney, Agent, or Firm* — Alleman Hall LLP

(57) ABSTRACT

Techniques are described in which storage nodes within a storage cluster are configured to support graph-based storage management. For example, a storage cluster comprises a network and a plurality of computing systems, each interconnected over the network, wherein the plurality of computing systems includes a plurality of storage nodes. The computing system of the plurality of computing systems is configured to allocate a volume of storage within the storage cluster, generate a volume graph of the volume, wherein the volume graph represents one or more functional elements in a data plane of the volume, and manage the volume based on the volume graph.

17 Claims, 11 Drawing Sheets

(56) References Cited

U.S. PATENT DOCUMENTS

| | | | | |
|---|---|---|---|---|
| 10,841,245 | B2 | 11/2020 | Gray et al. | |
| 10,949,303 | B2 | 3/2021 | Kohli | |
| 11,178,262 | B2 | 11/2021 | Goel et al. | |
| 2004/0123030 | A1* | 6/2004 | Dalal | G06F 3/0605 711/170 |
| 2007/0233985 | A1* | 10/2007 | Malhotra | G06F 3/0665 711/170 |
| 2008/0288739 | A1* | 11/2008 | Bamba | G06F 9/5083 711/E12.002 |
| 2013/0067159 | A1* | 3/2013 | Mehra | G06F 3/0689 711/E12.019 |
| 2014/0365898 | A1* | 12/2014 | Jaquet | G06F 9/5016 715/734 |
| 2016/0306574 | A1 | 10/2016 | Friedman et al. | |
| 2016/0349993 | A1 | 12/2016 | Udupi et al. | |
| 2018/0196817 | A1 | 7/2018 | Maybee et al. | |
| 2019/0012105 | A1* | 1/2019 | Schreter | G06F 3/0611 |
| 2021/0294775 | A1 | 9/2021 | Keller et al. | |

* cited by examiner

Layers of Abstraction

| Layer | Interface | API | Operations | Mapping |
|---|---|---|---|---|
| User Volume | Blocks (multiple of block size. E.g., 4KB, App configured) | LBA, num blocks | QoS, Compression, Encryption | Maps to a Logical Volume (1:1) |
| Logical Volume (Log Structured) | Variable length blocks | LBA, Length | Log structure into units of Chunks (e.g., 2MB) | Maps to a Durable Volume (1:1) |
| Durable Volume | Write Block Size separate from Read Block Size (e.g., 16KB. Calculated based on durability scheme) | LBA, num blocks | Replicate/Erasure Code | Maps to concatenation of N Raw Volume Sets (1:N) |
| Raw Volume Set | Device Blocks (multiple of device block size. E.g., 4KB). Configured by Admin | LBA, num blocks | Distribute data to members of the Set | Maps to N Raw Volumes based on the redundancy scheme (1:N) |
| Raw Volume | Device Blocks (multiple of device block size. E.g., 4KB). Configured by Admin | LBA, num blocks | Map to underlying Extent based of Offset | Maps to N Extents (1:N) |
| Extent | Device Blocks (multiple of device block size. E.g., 4KB). Configured by Admin | LBA, num blocks | Map to underlying Device (Controller, Namespace) | Maps to a contiguous piece from an SSD (E.g., 1GB) |

FIG. 3B

GRAPH-BASED STORAGE MANAGEMENT

CROSS REFERENCE TO RELATED APPLICATIONS

This application claims priority to Indian Provisional Application Serial No. 202241033908, filed Jun. 14, 2022, the entirety of which is hereby incorporated herein by reference for all purposes.

TECHNICAL FIELD

This disclosure relates to networking and storage systems and, more particularly, management of storage systems within data center networks.

BACKGROUND

In a typical cloud-based data center, a large collection of interconnected servers provides computing resources and/or storage capacity for execution of various applications. For example, a data center may comprise a facility that hosts applications and services for subscribers, e.g., customers or tenants of the data center. The data center may, for example, host all of the infrastructure equipment, such as compute nodes, networking and storage systems, power systems, and environmental control systems. In typical data centers, clusters of storage systems and application servers are interconnected via a high-speed switch fabric provided by one or more tiers of physical network switches and routers. Data centers vary greatly in size, with some public data centers containing hundreds of thousands of servers and are usually distributed across multiple geographies for redundancy.

Many devices within a computer network (e.g., storage/compute servers, firewalls, intrusion detection devices, switches, routers, and other network attached devices) often use general purpose processors, including multi-core processing systems, to process data (e.g., network or storage data). However, general purpose processing cores and multi-processing systems are normally not designed for high-capacity network and storage workloads of modern networks and can be relatively poor at performing packet stream processing. Further, in a large-scale fabric, storage systems may become unavailable from time to time, due to hardware error, software error, or other reasons. Data durability procedures may be employed to provide more reliable access to critical data.

SUMMARY

Techniques are described in which storage nodes within a storage cluster are configured to support graph-based storage management. In some examples, this disclosure describes operations performed by a compute node, storage node, computing system, network device, and/or storage cluster in accordance with one or more aspects of this disclosure. In one specific example, this disclosure describes a method comprising allocating, by a storage cluster having a plurality of storage nodes, a volume of storage within the storage cluster; generating a volume graph of the volume, wherein the volume graph represents one or more functional elements in a data plane of the volume; and managing the volume based on the volume graph.

In another example, this disclosure describes a computing system comprising: a network interface for interconnecting the computing system with at least one other computing system to form a plurality of computing systems over a network; and at least one storage node, wherein the at least one storage node is part of a storage cluster formed by the plurality of computing systems, and wherein the computing system is configured to: allocate a volume of storage within the storage cluster; generate a volume graph of the volume, wherein the volume graph represents one or more functional elements in a data plane of the volume; and manage the volume based on the volume graph.

In another example, this disclosure describes a computer-readable storage medium comprising instructions that, when executed, cause one or more processors to: allocate a volume of storage within a storage cluster; generate a volume graph of the volume, wherein the volume graph represents one or more functional elements in a data plane of the volume; and manage the volume based on the volume graph.

The details of one or more examples are set forth in the accompanying drawings and the description below. Other features, objects, and advantages of the invention will be apparent from the description and drawings, and from the claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3B is a table describing information relating to an example set of layers of abstractions, in accordance with the techniques described in this disclosure.

DETAILED DESCRIPTION

Figure 1A:
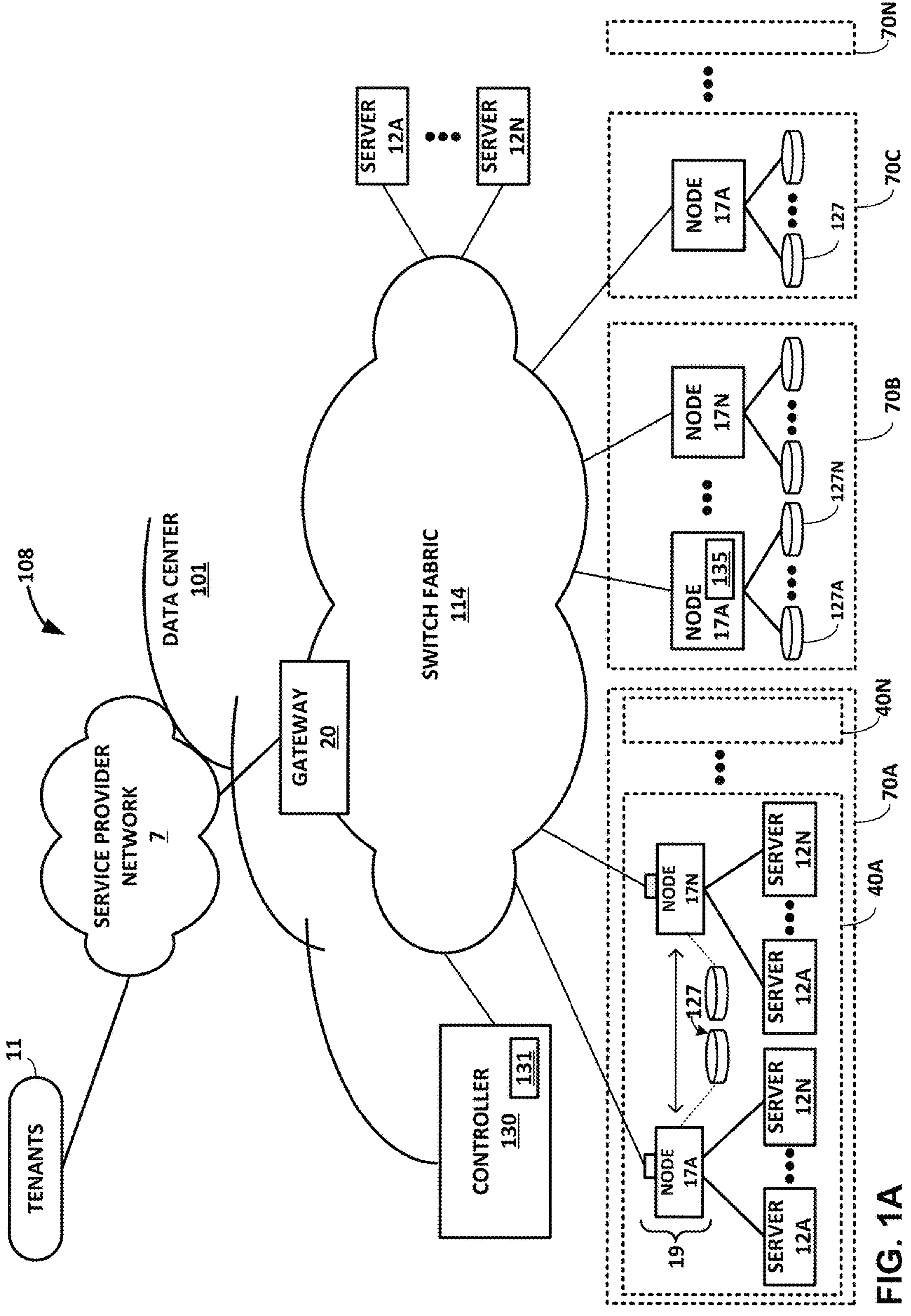
FIG. 1A is a block diagram illustrating an example system including one or more computing devices configured to support graph-based storage management, in accordance with one or more aspects of the present disclosure.

Techniques are described in which storage nodes within a storage cluster are configured to support graph-based storage management. For example, storage cluster resources (e.g., storage nodes and/or storage devices) may be allocated for a "volume," which may, in some examples, refer to a conceptual abstraction of a unit of storage in the storage cluster. A volume represents a logical storage device presented by a collection of one or more storage nodes, where the volume provides a level of abstraction from the physical storage devices and, moreover, presents block-level storage operations on the logical storage. The volume can be designed as a scale-out model that enables local pools of storage devices in a storage cluster to act as a common pool of storage. Such designs can enable a storage system that is durable and redundant. The scale-out model is enabled by a data plane of the volume hosted on a full-mesh of interconnected storage nodes, and management and control planes of the volume may logically tie together operation of the storage nodes.

Storage nodes within a storage cluster can be configured to generate a graph-based representation of functional elements in a data plane of the volume for which the storage nodes are allocated. The graph representation of the volume, also referred to as a "volume graph," can be used to manage the volume. For example, the storage nodes allocated for a volume may perform various functions, such as storage functions and/or functions offloaded from servers, such as security functions (e.g., encryption), compression and regular expression processing, data durability functions, data storage functions and network operations. A volume graph of the volume can include nodes in the graph (referred to as "function nodes") that represent the functions of the storage nodes. The volume graph also includes leaf nodes that represent the resources (e.g., storage nodes and/or storage devices) allocated for the functions. The volume graph further includes root nodes that represent the tenants or customers of the storage cluster associated with the volume.

As described in this disclosure, storage nodes may use the volume graph for management of the volume, such as for resource allocation, event management, and recovery at scale (e.g., failover) for the volume. In some examples, a function node within the volume graph that represents a function (e.g., data durability scheme) of the volume may be replaced with another function node to achieve a different kind of function for the volume. In some examples, a function node within the volume graph that represents a first resource allocated for a function may be replaced with another function node that represents a second resource for the function in the event the first resource fails, fails to meet quality of service standards, or is otherwise no longer suitable for the volume.

Techniques described herein may provide one or more technical advantages. For example, by generating a graph-based representation of functional elements in a data plane of a volume, the complexity in management of the volume is reduced. For example, to achieve a different kind of function (e.g., data durability scheme) for the volume, a function node that represents one data durability scheme (e.g., erasure coding) in the volume graph may simply replace the function node with another function node that represents another data durability scheme (e.g., replication) within the volume graph and map one or more leaf nodes that represent resources allocated for the new data durability scheme. In some examples, the volume graph may be used to rebuild the volume by simply replacing leaf nodes that represent resources that have failed, exceed quality of service standards, or are otherwise no longer suitable for the volume. In some examples, a volume graph may simply be reconstructed on a secondary storage node to assume the role as the primary storage node to achieve failover.

FIG. 1A is a block diagram illustrating an example system 108 including one or more storage nodes configured to support graph-based storage management, in accordance with one or more aspects of the present disclosure. Techniques described herein may enable storage nodes to generate a graph-based representation of the functional elements in a data plane of a volume in a storage cluster. Management of the volume can be performed using the graph representation of said volume. Storage nodes as described herein may also be referred to as data processing units (DPUs) or devices including DPUs. Other devices within a network, such as routers, switches, servers, firewalls, gateways, and the like, may readily be configured to utilize the data processing techniques described herein.

System 108 includes a data center 101 capable of providing data processing and data storage. In some examples, data center 101 may represent one of many geographically distributed network data centers. In general, data center 101 provides an operating environment for applications and services for tenants 11 (e.g., customers) coupled to the data center 101. Data center 101 may host infrastructure equipment, such as compute nodes, networking and storage systems, redundant power supplies, and environmental controls. In the depicted example, the tenants 11 are coupled to the data center 101 by service provider network 7 and gateway device 20. Service provider network 7 may be coupled to one or more networks administered by other providers and may thus form part of a large-scale public network infrastructure, e.g., the Internet.

In the example of FIG. 1A, data center 101 is a facility that provides information services for tenants 11. Tenants 11 may be collective entities, such as enterprises and governments, or individuals. For example, a network data center may host web services for several enterprises and end users. Other exemplary services may include data storage, virtual private networks, file storage services, data mining services, scientific- or super-computing services, and so on.

Controller 130, shown included within data center 101 of FIG. 1A, may be one or more computing devices that manage aspects of how data center 101 is configured and/or operates. In some examples, controller 130 may operate as a high-level controller or may serve as a software-defined networking (SDN) controller that configures and manages the routing and switching infrastructure of data center 101. In such an example, controller 130 may provide a logically (and in some cases physically) centralized controller for facilitating operation of one or more virtual networks within data center 101. Controller 130 may operate on its own, or in response to signals received from an administrator device (not shown) operated by an administrator. Controller 130 may offer application programming interface ("API") support for various cluster services, which may include orchestration, storage services, and/or storage management capabilities. Such capabilities may also include resource balancing, infrastructure discovery, registration, and initialization, role-based access control, multi-tenancy and resource partitioning, application workload deployment and orchestration, flexible network control, identity management, and hardware lifecycle management and monitoring.

Controller 130 may also be responsible for allocating and accounting for resources for a volume, which may refer to a conceptual abstraction of a storage unit within the storage cluster. In such an example, a volume may be a storage container divided into fixed size blocks and be capable of being allocated and deallocated by controller 130 as well as being written to and read from by nodes or other devices within the data center 101.

In the illustrated example, data center 101 includes a set of storage systems and application servers 12 interconnected via a switch fabric 114. In some examples, servers 12 are arranged into multiple different server groups, each including any number of servers up to, for example, "N" servers 12A-12N. As used throughout this disclosure, N may be different in each instance. For example, N may be different for different server groups. Servers 12 provide computation and storage facilities for applications and data associated with tenants 11 and may be physical (bare-metal) servers, virtual machines running on physical servers, virtualized containers running on physical servers, or combinations thereof.

In the example of FIG. 1A, one or more of servers 12 may be coupled to switch fabric 114 by one or more nodes 17 for processing streams of information, such as network packets or storage packets. For example, nodes 17 may be assigned respective IP addresses and provide routing operations for servers 12. Nodes 17 may interface with and utilize core switches within switch fabric 14 to provide full-mesh (any-to-any) interconnectivity such that any nodes 17 (or servers 12) may communicate packet data for a given packet flow to any node 17 using any number of parallel data paths within the data center 101.

Figure 2A:
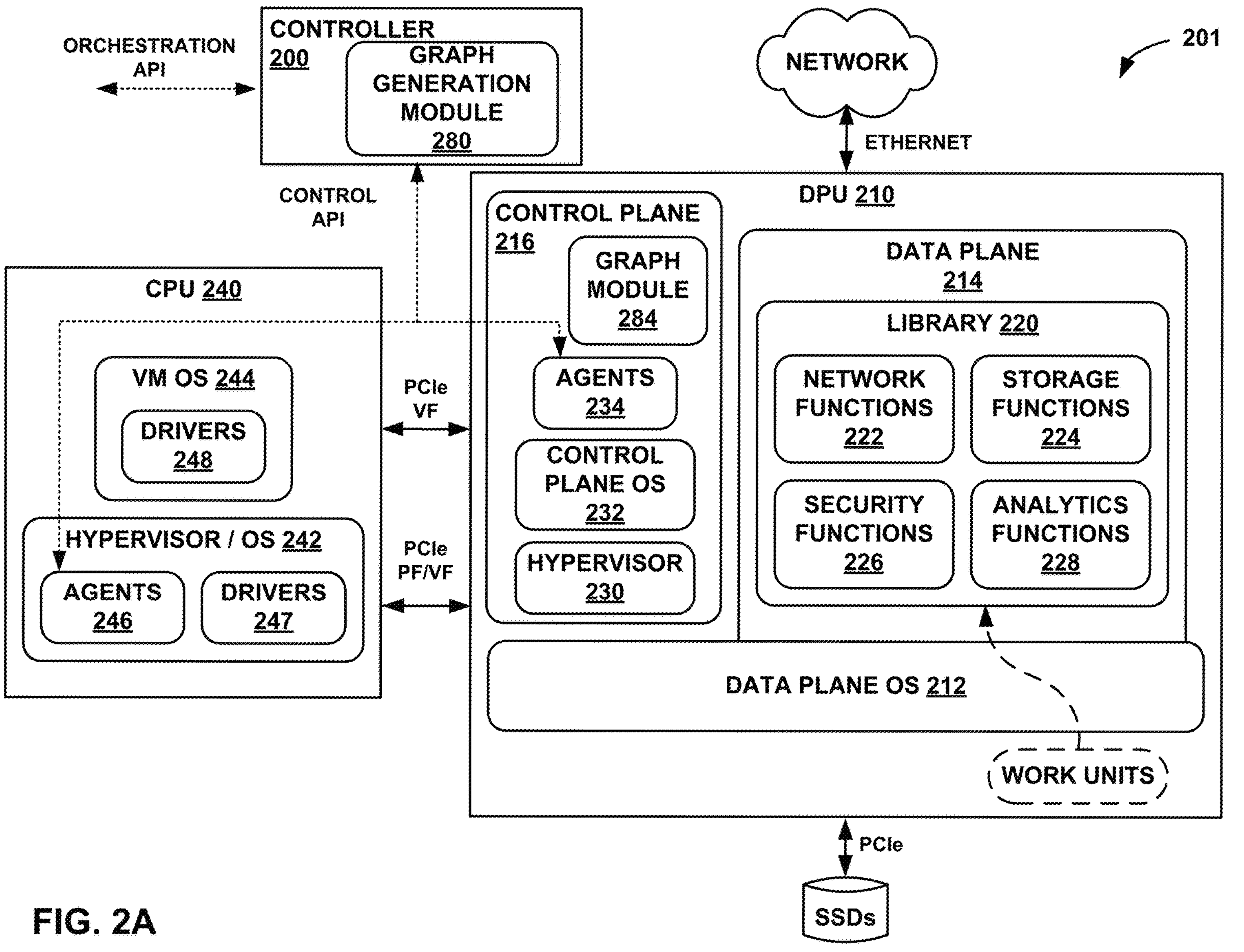
FIG. 2A is a block diagram illustrating a system having a data processing unit (DPU) configured to support graph-based storage management, in accordance with the techniques described in this disclosure.
Figure 2B:
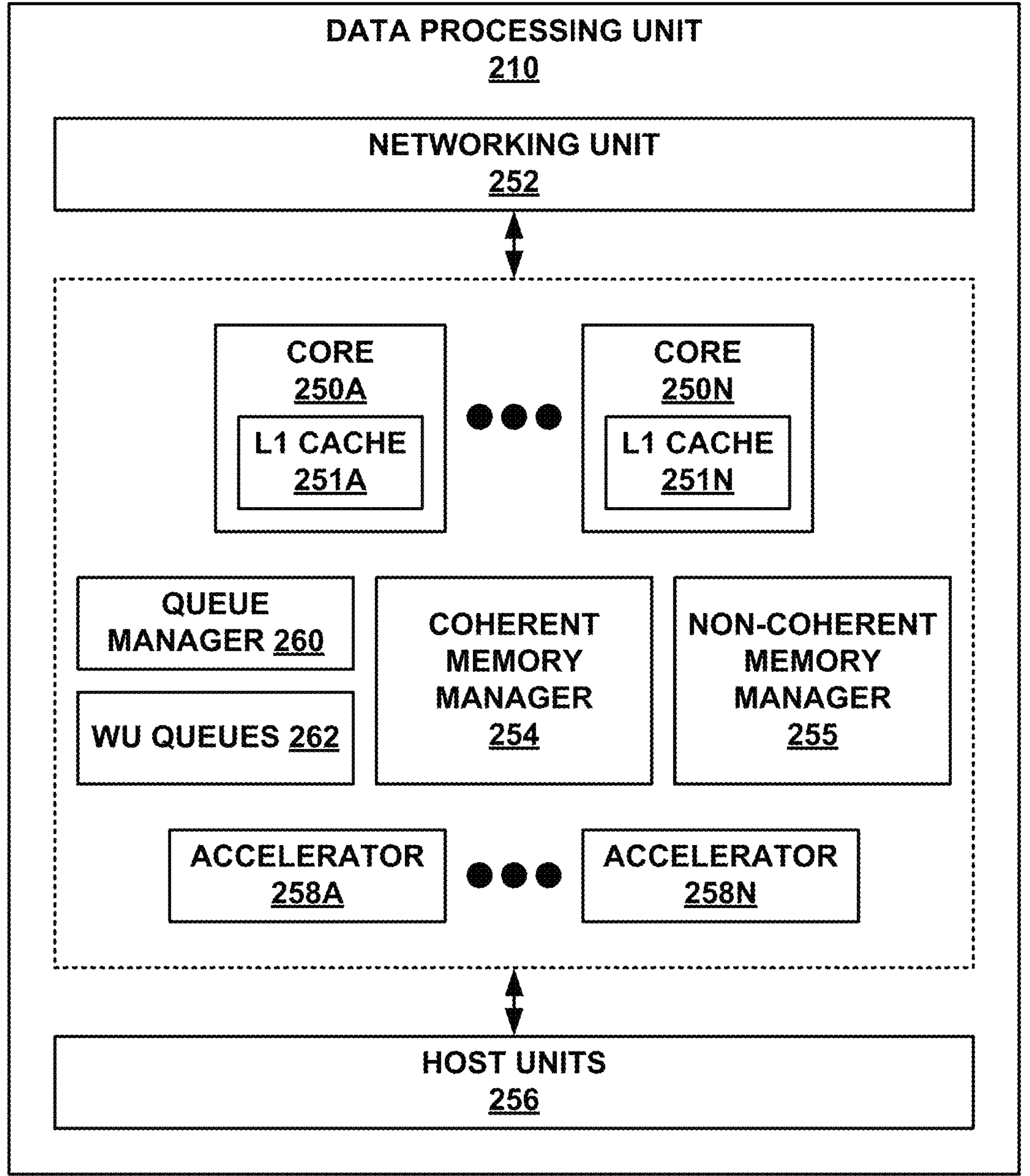
FIG. 2B is a block diagram illustrating hardware components of an example DPU, in accordance with the techniques of this disclosure.

Example architectures of nodes 17 are described herein with respect to FIG. 2A and FIG. 2B. For some or all of such examples, the architecture of each node 17 comprises a multiple core processor system that represents a high performance, hyper-converged network, storage, and data processor and input/output hub. The architecture of each node 17 may be optimized for high performance and high efficiency stream processing. For purposes of example, DPUs corresponding to or within each node 17 may execute an operating system, such as a general-purpose operating system (e.g., Linux or Unix) or a special-purpose operating system, that provides an execution environment for data plane software for data processing.

More details on how nodes 17 may operate are available in U.S. Pat. No. 10,841,245, entitled "Work Unit Stack Data Structures in Multiple Core Processor System," U.S. Pat. No. 10,540,288, entitled "EFFICIENT WORK UNIT PROCESSING IN A MULTICORE SYSTEM", filed Feb. 2, 2018, and in U.S. Pat. No. 10,659,254, entitled "Access Node Integrated Circuit for Data Centers which Includes a Networking Unit, a Plurality of Host Units, Processing Clusters, a Data Network Fabric, and a Control Network Fabric," the contents of which are hereby incorporated by reference in their entireties for all purposes.

Referring back to the example shown in FIG. 1A, nodes 17 are shown logically or physically organized within node groups 19, units 40, and racks 70. Nodes 17 may be arranged into multiple different node groups 19, each node group 19 including any number of nodes up to, for example, "N" nodes 17A-17N (representing any number of nodes 17). For example, rack 70A includes one or more node groups 19, each node group 19 including a set of nodes 17 and storage devices 127. The node group 19 and the set of servers 12 supported by the nodes 17 of the node group 19 may be referred to herein as a network compute storage unit (NCSU) 40. Illustrated in FIG. 1A are NCSU 40A through NCSU 40N, which represent any number of NCSUs. As used in this disclosure, "N" may represent any number and may vary across and/or within the Figures and their descriptions. For example, nodes 17A-17N and NCSU 40A-40N may have a different "N." For ease of illustration, only components of NCSU 40A are shown. In some examples, data center 101 may include many NCSUs, and multiple NCSUs 40 may be organized into racks 70, which may be logical racks and/or physical racks within data center 101. For example, in some implementations, two NCSUs may compose a logical rack, and four NCSUs may compose a physical rack. Other arrangements are possible. Such other arrangements may include nodes 17 within a rack 70 being relatively independent and not logically or physically included within any node group or NCSUs 40.

Some nodes 17 are shown connected to one or more servers 12, and such nodes 17 may serve to offload (from server 12) aspects of the handling of data packets and other network-related functions. For example, each node group 19 of rack 70A may be configured to operate as a high-performance I/O hub designed to aggregate and process network and/or storage I/O for multiple servers 12. As further described below, the set of nodes 17 within each of the node groups 19 can provide programmable, specialized I/O processing circuits for handling networking and communications operations on behalf of servers 12. In addition, in some examples, each of node groups 19 may include storage devices 127, such as solid-state drives (SSDs) and/or hard disk drives (HDDs), configured to provide network accessible storage for use by applications executing on the servers 12. In some examples, one or more of the SSDs may comprise non-volatile memory (NVM) or flash memory. Although illustrated as logically within node groups 19 and external to nodes 17, storage devices 127 may alternatively, or additionally, be included within one or more nodes 17 or within one or more servers 12.

One or more nodes 17 may serve as storage nodes ("storage targets") that may not be directly connected to any of servers 12. For instance, FIG. 1A illustrates rack 70B, which includes nodes 17A through 17N (representing any number of nodes 17). Nodes 17 of rack 70B may be configured to store data within one or more storage devices 127 (included within or connected to such nodes 17) in accordance with techniques described herein. Nodes 17 within rack 70B may be viewed as network interface subsystems that serve as a data storage node configured to store data across storage devices 127. In the example illustrated, nodes 17 within rack 70B are not organized into groups or units, but instead, are relatively independent of each other, and are each capable of performing storage functions described herein. In other examples, however, nodes 17 of rack 70B may be logically or physically organized into groups, units, and/or logical racks.

Rack 70C is illustrated as being implemented in a manner similar to rack with nodes 17 serving as storage nodes configured to store data within storage devices 127 (included within or connected to such nodes 17). For ease of illustration, only racks 70A, 70B, 70C, through 70N are illustrated in FIG. 1A. As can readily be appreciated, any number of racks 70 may be included within data center 101 in any configuration, including those described herein. Further, although FIG. 1A illustrates one rack 70A with nodes 17 that support servers 12 and other racks 70B, 70C with nodes 17 serving as storage nodes, any number and combination of racks may be implemented. Further, any of racks 70 may include a mix of nodes 17 supporting servers 12 and nodes 17 serving as storage nodes. Still further, although data center 101 is illustrated in the context of nodes 17 being arranged within racks 70, other logical or physical arrangements of nodes 17 may also be used. For example, other implementations may involve groups, units, or other logical or physical arrangements not involving racks.

Nodes 17 of rack 70B (or rack 70C) may be devices or systems that are the same as or similar to nodes 17 of rack 70A. In other examples, nodes 17 of rack may have different capabilities than those of rack 70A and/or may be implemented differently. For example, in the depicted example of FIG. 1A, nodes 17 of rack 70B may be somewhat more capable than nodes 17 of rack 70A (e.g., more computing power, more memory capacity, more storage capacity, and/or additional capabilities). For instance, each of nodes 17 of rack 70B may be implemented by using a pair of nodes 17 of rack 70A. To reflect such an example, nodes 17 of rack 70B and 70C are illustrated in FIG. 1A as being larger than nodes 17 of rack 70A.

As further described herein, in one example, each node 17 may be a highly programmable I/O processor specially designed for performing storage functions and/or for offloading certain functions from servers 12. Each node 17 may be implemented as a component (e.g., electronic chip) within a device (e.g., compute node, application server, or storage server), and may be deployed on a motherboard of the device or within a removable card, such as a storage and/or network interface card. In some examples, each node 17 may be implemented as one or more application-specific integrated circuit (ASIC) or other hardware and software components, each supporting a subset of storage devices 127 or a subset of servers 12.

In some examples, each node 17 includes a number of internal processor clusters, each including two or more processing cores and equipped with hardware engines that can offload certain functions from servers 12, such as security functions (e.g., encryption), acceleration (e.g., compression) and regular expression (RegEx) processing, data durability functions (e.g., erasure coding, replication, etc.), data storage functions, and network operations. One or more nodes 17 may include a data durability module or unit, referred to as an “accelerator” unit, which may be implemented as a dedicated module or unit for performing data durability functions. For example, one or more computing devices may include a node including one or more data durability, data reliability, and/or erasure coding accelerator units.

In some examples, one or more nodes 17 are configured to establish a volume for system 108. Multiple volumes can be established for a given system. A volume represents a logical storage device including a set of one or more nodes 17, where the logical storage device provides a level of abstraction from the physical storage devices 127 and, moreover, presents block-level storage operations on the logical storage. A volume can provide persistent storage of data blocks and can enable seamless hardware-based data durability functions enabled by the hardware engines of nodes 17. An example system architecture of a volume (otherwise referred to as a “Durable Block Device”) is described in U.S. Pat. No. 10,949,303, entitled “DURABLE BLOCK STORAGE IN DATA CENTER ACCESS NODES WITH INLINE ERASURE CODING,” filed 10 Dec. 2018, the entire content of which is hereby incorporated by reference for all purposes.

Techniques described herein enable a graph-based management of the storage cluster. One or more nodes 17 may generate a graph-based representation of the functional elements in a data path of a volume of the storage cluster. As further described below, the volume graph may include various layers of abstraction of the volume, which represents one or more data storage schemes (e.g., data durability, data reliability, etc.). One or more nodes 17 and storage devices 127 may be used to implement the one or more data storage schemas. In the example of FIG. 1A, controller 130 may include a graph generation module 131 to generate volume graphs for target nodes, e.g., volume graph 135 that represents storage functions and/or functions offloaded from servers 12 and the allocated resources for the functions, such as nodes 17 and/or storage devices 127.

Node 17A of rack 70B may use volume graph 135 for managing the storage cluster. For example, node 17A of rack 70B may convey information based on volume graph 135 to each DPU to manage the storage cluster. In some examples, node 17A of rack 70B may use volume graph 135 for modifying existing volumes, resource allocation, event management, dynamic rebalancing of resources, and/or volume property modification for a storage cluster. An example of a volume graph and use of the volume graph is described herein with respect to FIG. 4.

Figure 1B:
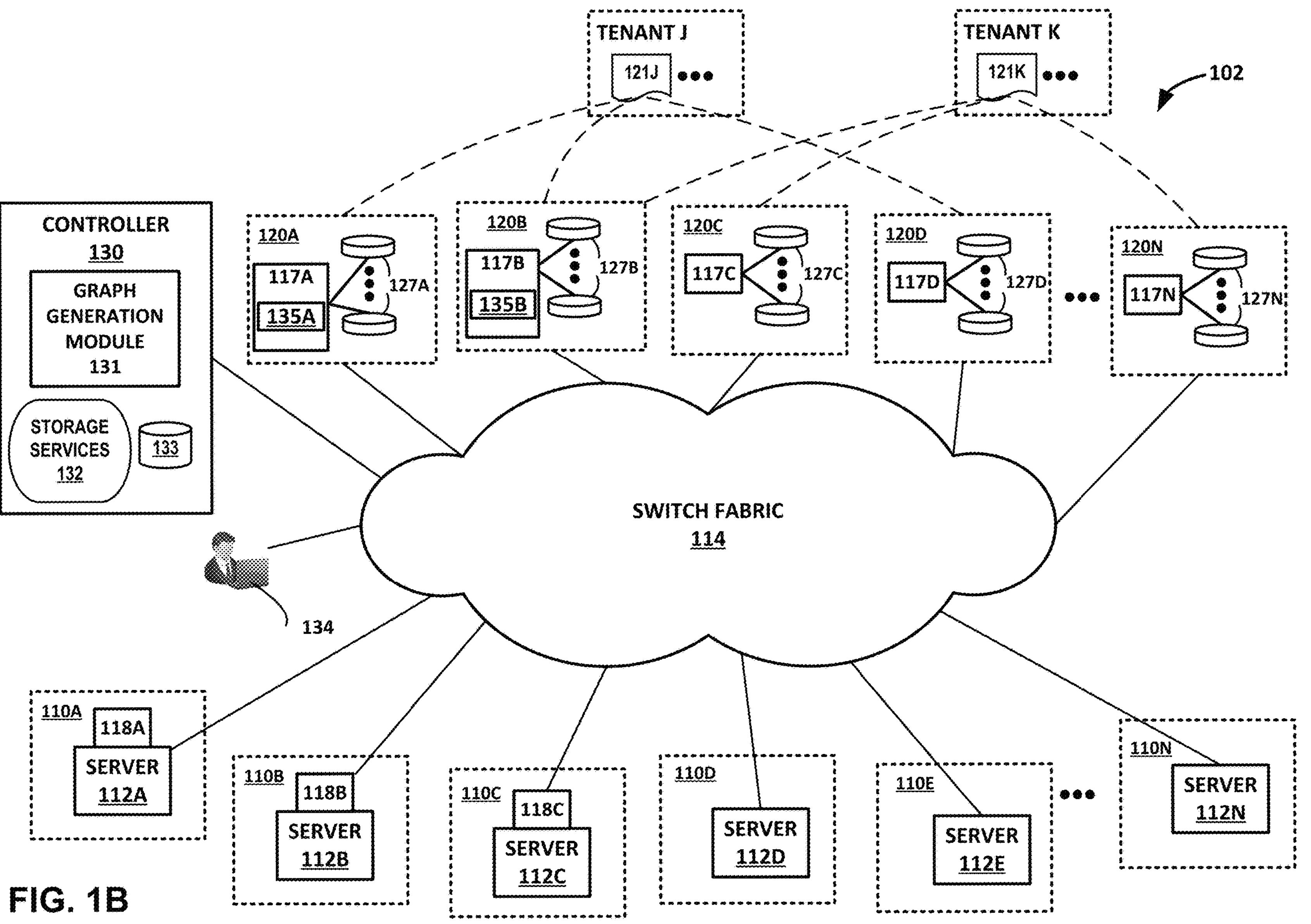
FIG. 1B is a simplified block diagram illustrating an example storage cluster, in accordance with one or more aspects of the present disclosure.

FIG. 1B is a simplified block diagram illustrating an example storage cluster, in accordance with one or more aspects of the present disclosure. FIG. 1B illustrates storage cluster 102, which may be an example storage cluster included within data center 101 of FIG. 1A. Storage cluster 102 in FIG. 1B is similar to the illustration of data center 101 of FIG. 1A and includes many of the same components illustrated in FIG. 1A. However, elements of FIG. 1A have been rearranged within FIG. 1B to help illustrate certain aspects of how storage cluster 102 might be implemented within data center 101.

In the example of FIG. 1B, storage cluster 102 includes controller 130, one or more initiator nodes 110, and one or more storage nodes 120, all capable of communicating through switch fabric 114. Storage cluster 102 can include one or more volumes 121 (e.g., volume 121J and volume 121K), each of which might be considered a conceptual abstraction of a unit of storage in storage cluster 102. Volumes may be associated with different tenants, or customers, of data center 101 for storage cluster 102. For example, in the example illustrated in FIG. 1B, volume 121J has been allocated for use by tenant J, while volume 121K has been allocated for use by tenant K. In FIG. 1B, dotted lines from each of volumes 121J and 121K are intended to illustrate that such volumes 121 are each stored across multiple storage nodes 120. Although only two volumes are illustrated in FIG. 1B, storage cluster 102 may support any number of volumes 121 for any number of tenants. Moreover, while a single tenant is illustrated in FIG. 1B for each of volumes 121, a volume may be allocated for use by a plurality of tenants.

As in FIG. 1A, controller 130 in FIG. 1B can provide cluster management orchestration of storage resources within storage cluster 102. Also, as in FIG. 1A, controller 130 in FIG. 1B may be implemented through any suitable computing system, including one or more compute nodes within data center 101 or storage cluster 102. Although illustrated as a single system within storage cluster 102 in FIG. 1B, controller 130 may be implemented as multiple systems and/or as a distributed system that resides both inside and outside data center 101 and/or storage cluster 102.

In other examples, some or all aspects of controller 130 may be implemented outside of data center 101, such as in a cloud-based implementation.

In the example of FIG. 1B, controller 130 includes storage services module 132 and data store 133. Storage services module 132 of controller 130 may perform functions relating to establishing, allocating, and enabling read and write access to one or more volumes 121 within storage cluster 102. In general, storage services module 132 may perform functions that can be characterized as "cluster services" or "storage services," which may include allocating, creating, and/or deleting volumes. In some examples, storage services module 132 may also provide services that help with compliance with quality of service standards for volumes 121 within storage cluster 102. In some examples, storage services module 132 may also manage input from one or more administrators (e.g., operating administrator device 134). In general, storage services module 132 may have a full view of all resources within storage cluster 102 and how such resources are allocated across volumes 121.

Data store 133 may represent any suitable data structure or storage medium for storing information related to resources within storage cluster 102 and how such resources are allocated within storage cluster 102 and/or across volumes 121. Data store 133 may be primarily maintained by storage services module 132.

Each of initiator nodes 110 may correspond to or be implemented by one or more of the servers 12 and/or nodes 17 illustrated in FIG. 1A. In the example of FIG. 1B, each of initiator nodes 110 is shown as including at least one server 112, with initiator nodes 110A-110C each including a DPU 118. Each server 112 within initiator nodes 110 of FIG. 1B may correspond to one or more of servers 12 of FIG. 1A. Similarly, each DPU 118 within initiator nodes 110A-110C of FIG. 1B may correspond to one or more of nodes 17 (or DPUs 17) of FIG. 1A. As such, the descriptions of servers 12 and nodes 17 provided in connection with FIG. 1A may therefore apply to servers 112 and DPUs 118 of FIG. 1B.

Initiator nodes 110 illustrated in FIG. 1B may be involved in causing or initiating a read and/or write operation with the storage cluster represented by storage cluster 102. DPUs 118 within each of initiator nodes 110 may serve as the data-path hub for each of initiator nodes 110, connecting each of initiator nodes 110 (and storage nodes 120) through switch fabric 114. In some examples, one or more of initiator nodes 110 may be an x86 server that may execute NVMe (Non-Volatile Memory Express) over a communication protocol, such as TCP. In some examples, other protocols may be used, including "FCP" as described in U.S. Pat. No. 11,178,262, entitled "FABRIC CONTROL PROTOCOL FOR DATA CENTER NETWORKS WITH PACKET SPRAYING OVER MULTIPLE ALTERNATE DATA PATH," which is hereby incorporated by reference in its entirety for all purposes.

Each of storage nodes 120 may be implemented by the nodes 17 and storage devices 127 that are illustrated in FIG. 1A. Accordingly, the description of such nodes 17 and storage devices 127 in FIG. 1A may therefore apply to DPUs 117 and storage devices 127 of FIG. 1B, respectively. Storage nodes 120 are illustrated in FIG. 1B such as to emphasize that, in some examples, each of storage nodes 120 may serve as storage targets for initiator nodes 110.

FIG. 1B also includes conceptual illustrations of volumes 121J and 121K. Within storage cluster 102, volumes 121 may serve as storage containers for data associated with tenants of storage cluster 102, where each such volume is an abstraction intended to represent a set of data that is stored across one or more storage nodes 120. In some examples, each of volumes 121 may be divided into fixed size blocks and may support multiple operations. Typically, such operations generally include a read operation (e.g., reading one or more fixed-size blocks from a volume) and a write operation (e.g., writing one or more fixed-size blocks to a volume). Other operations are possible and are within the scope of this disclosure.

In the example illustrated in FIG. 1B, controller 130 may receive a request to allocate a volume. For instance, in an example that can be described with reference to FIG. 1B, controller 130 can detect input that it determines corresponds to a request to create a new volume. In some examples, the input originates from one or more of initiator nodes 110, seeking to allocate new storage for a tenant of storage cluster 102 (e.g., tenant "J" or tenant "K" depicted in FIG. 1B). In other examples, the input may originate from an administrator device (e.g., administrator device 134), which may be operated by an administrator seeking to allocate new storage on behalf of a tenant of storage cluster 102. In still other examples, the input may originate from a different device.

Controller 130 may allocate a volume based on one or more rules (or criteria). The rules can be based on one or more metrics, such as input/output operations per second ("IOPs") availability, storage capacity availability, failure or fault domains, quality of service standards, and/or volume type, such as a durability schema (e.g., erasure coding, replication). For example, controller 130 may receive information describing the one or more rules, where the information is from or derived from input originating from an administrator (e.g., through administrator device 134). In other examples, such input may originate from a representative of the tenant (e.g., through a client device, not specifically shown in FIG. 1B), where the representative selects or specifies rules for storage cluster 102. Controller 130 can output the information about the request to allocate a new volume to storage services module 132, which evaluates the information and determines that the request is for a new volume that is to be allocated for a specific tenant (e.g., tenant "J" in the example being described). Storage services module 132 further determines, based on the input received by controller 130, information about the volume type and the quality of service to be associated with the new volume. Storage services module 132 accesses data store 133 and determines which of storage nodes 120 may be allocated to support the new volume. Any number of storage nodes may be allocated to support a volume. In the depicted example of FIG. 1B, volume 121J is allocated using three storage nodes 120. In some examples, such a determination may involve evaluating which DPUs 117 and storage devices 127 within storage nodes 120 are available to be involved in serving read and write requests to the new volume. For example, storage services module 132 may determine which of DPUs 117 and/or storage devices 127 have enough IOPs needed for the volume. Storage services module 132 may additionally, or alternatively, determine which of storage devices 127 have enough storage capacity for the volume.

In some examples, storage services module 132 may determine which DPUs 117 and storage devices 127 within storage nodes 120 may provide data protection for the new volume. For example, to determine which DPUs 117 and storage devices 127 within storage nodes 120 may be allocated to support the new volume, storage services module 132 may determine whether the DPUs 117 and storage devices 127 are located in different failure domains or fault domains to reduce the likelihood that more than one DPU and storage devices 127 will be lost or unavailable at the same time.

In some examples, storage services module 132 may determine the usage of DPUs 117 and storage devices 127 within storage nodes 120 and allocate the DPUs 117 and storage devices 127 for the new volume in a manner that load balances the usage of DPUs 117 and storage devices 127 within storage nodes 120. For example, storage services module 132 may determine the IOPs usage of DPUs 117 and storage devices 127, apply a cost to each of DPUs 117 and storage devices 127 based on their IOPs usage, and allocate the DPUs 117 and storage devices for the new storage volume based on the cost of IOP usage (e.g., DPUs 117 and storage devices 127 with the lowest cost can be allocated). Other criteria can be utilized. In some examples, storage services module 132 may determine the cost of each storage device 127 based on their storage capacity usage, and DPUs 117 and storage devices 127 can be allocated based on the determined cost (e.g., DPUs 117 and storage devices 127 with the lowest cost can be allocated).

In some examples, controller 130 may allocate one or more storage nodes 120 as primary, secondary, and/or plex nodes for volume 121J. Such allocation can be performed for various functions, including data reliability and/or data durability schemes. For example, data durability schemes (e.g., replication, erasure coding, etc.) can be implemented by storing data across multiple storage nodes 120 and/or multiple fault domains. In some implementations, a primary target node (e.g., primary storage node) may be used as a communication or interaction point for other devices within storage cluster 102 (e.g., initiator nodes 110). For example, storage services module 132 may designate storage node 120A as a "primary" target node that serves as a primary target or interaction node for operations involving the volume, with one or more of storage nodes 120A, 120B, and 120D (the storage nodes that are included within the volume) serving as plex nodes that are used to store data associated with the volume.

Plex nodes may be used to store the data associated with a volume and may be managed by the primary target node. A "plex" may represent a unit of data (e.g., located on an individual drive) that is a member of a particular volume (e.g., erasure coded volume). In this example, volume 121J may include one or more plex nodes local and/or remote to a storage node (e.g., storage nodes 120A, 120B, and 120D). A storage node 120 may have plex nodes for a plurality of volumes. For example, storage node 120B may have one or more plex nodes for volume 121J and one or more plex nodes for volume 121K.

Storage services module 132 may also designate a "secondary" target node (e.g., secondary storage node) that serves as a failover target or interaction node when the primary storage node is not available or is inoperable. The "secondary" target node may be a storage node within the same volume as the primary storage node. For example, storage services module 132 may designate storage node 120B as a "secondary" target node that serves as a failover target or interaction node when primary storage node 120A is not available or is inoperable. In these examples, volume 121J may provide journaling to provide data reliability in which an intent log (i.e., journal) including data and metadata of the primary target node (e.g., storage node 120A) is replicated to the secondary target node (e.g., storage node 120B) such that any write that is acknowledged to the host server for the application (e.g., servers 112) can be reliably performed to the underlying storage media in response to failure to the primary target node.

Typically, storage services module 132 ensures that the designated primary target node (e.g., storage node 120A) and the secondary target node (e.g., storage node 120B) are assigned to different storage nodes 120 or fault domains. Plex nodes can also be stored across different storage nodes 120 or fault domains. In some implementations, the same storage node 120 may be used for both a plex node and the primary target (or, alternatively, as a plex node and the secondary target node).

In some examples, volume 121J may use log structuring with data durability schemes, such as to gather multiple data blocks into larger chunks of data (or divide a large data block into smaller chunks of data) for data durability schemes prior to storage across multiple storage devices.

Management of a volume can be performed using various techniques. In some implementations, a volume graph of the functional elements in the data plane of a volume (e.g., volume 121J) is used to manage the volume within a storage cluster (e.g., storage cluster 102). The volume graph can be generated in various ways. For example, controller 130 may include a graph generation module 131 to generate a volume graph for target nodes that represents storage functions and/or functions offloaded from servers 112 and the allocated resources for the functions, such as storage nodes 120 and/or storage devices 127. More specifically, graph generation module 131 may generate volume graph 135A for a primary target node for volume 121J (e.g., storage node 120A), where volume graph 135A may represent the functional elements in the data plane of volume 121J. A volume graph 135 can be configured in various graph structures. In some examples, volume graph 135 may represent a tree structure including function nodes representing the functions associated with a volume with leaf nodes representing resources allocated for the functions. For example, volume graph 135A may include a root node representing host servers associated with volume 121J, an intermediate node (e.g., function node) that represents a data durability operation implemented by volume 121J with one or more leaf nodes that represent the resources allocated for the data durability operation.

Storage nodes 120 may be allocated to a volume for various functions. For example, volume graph 135A may include the storage nodes 120 allocated for a data durability scheme of volume 121J, such as an erasure coding scheme. In this example, an erasure coding block size of volume 121J may be represented as m+n, where the variable m is the original amount of data and the variable n is the extra or redundant data added to provide protection from failures. For instance, storage services module 132 may allocate DPUs 117 and storage devices 127 within storage nodes 120A, 120B, and 120D in accordance with the erasure coding scheme (e.g., m+n). In this example, graph generation module 131 may generate volume graph 135A that represents the DPUs 117 and storage devices 127 within storage nodes 120A, 120B, and 120D that are allocated for the erasure coding scheme for volume 121J. For example, volume graph 135A may include a function node in volume graph 135A that represents an erasure coded volume for volume 121J with leaf nodes representing the allocated resources for the erasure coded volume.

In some implementations, a volume may alternatively, or additionally, provide a replication scheme. For example, the block size of a replication volume of volume 121J may be represented by a replication factor of "X" that represents the factor in which to replicate the data to provide high data availability to protect against device or node failures. Graph generation module 131 may generate volume graph 135A that represents the DPUs 117 and storage devices 127 within storage nodes 120A, 120B, and 120D that are allocated for the replication scheme for volume 121J. For example, volume graph 135A may include a function node that represents a replication volume for volume 121J with leaf nodes representing the allocated resources for the replication volume.

In some implementations, a volume may additionally, or alternatively, provide a journaling scheme to provide data reliability in the event of failure. For example, volume graph 135A may include a function node that represents a journal volume for volume 121J with leaf nodes representing a copy of the journal stored (e.g., in non-volatile memory (NVM)) in the primary target node (e.g., storage node 112A) and another copy of the journal stored in the secondary target node (e.g., storage node 112B).

In some implementations, a volume may provide log structuring prior to the performance of the data durability schemes. For example, volume graph 135A may include a function node that represents a log structuring volume for volume 121J with leaf nodes representing the data durability volumes.

A volume graph can include one or more root nodes, each representing a host server executing an application that initiates read and write operations to a volume. For example, volume graph 135A can include a root node representing DPU 118A of initiator node 110A that may initiate read and write requests for an application executing on server 112A that correspond to volume 121J.

A volume graph 135 may be used for management of a volume. For example, volume graph 135A may be used to allocate resources for volume 121J, modify allocated resources for volume 121J, manage events associated with resources allocated for volume 121J, dynamically rebalance resources allocated for volume 121J, and/or manage volume property modification for volume 121J. As one example, a volume graph 135 may be used to modify a data durability scheme of a volume. For instance, volume 121J may originally implement erasure coding. To modify the data durability scheme of volume 121J from erasure coding to replication, graph generation module 131 may modify volume 121J by replacing the function node representing erasure coded volume and its leaf nodes with a function node that represents a replication volume with leaf nodes representing the allocated resources for the replication volume.

In some examples, a volume graph 135 may be used for event management. Events may include a storage node 120 going down, a storage device 127 being pulled out, the deletion of a volume, and/or any other event associated with resources allocated for a volume graph 135. A volume graph 135 may be used to rebuild volumes based on an event. For example, a network device including storage devices 127 may detect a failure to one of the storage devices 127 and generate an event indicating that the failed storage device has failed. The event can be propagated up the layers of the volume graph 135. For example, such an event can be propagated from a leaf node representing the failed storage device 127 to a parent node of said leaf node, e.g., a function node representing a data durability volume. In response to the function node representing the data durability volume receiving the event, storage node 120 (that includes the failed storage devices 127) may send a message to controller 130 to inform controller 130 of the failed storage device 127. Graph generation module 131 may then rebuild the one or more leaf nodes of the data durability volume with another storage device.

In some examples, volume graph 135 may be used to dynamically rebalance resources for a volume 121. For example, storage devices and/or nodes may obtain one or more metrics including storage usage, IOPs usage, health of the storage devices, bandwidth of the nodes, etc. Storage devices and/or nodes may compare the metrics with a threshold and generate alerts if the metrics reach a certain threshold(s). Based on the alerts, graph generation module 131 may rebalance the load to the resources based on the alerts. As one example, the storage capacity of a storage device 127 may exceed a storage usage threshold. In response, the storage device 127 may generate an alert. The alert can be propagated up the layers of the volume graph 135. For example, such an alert can be propagated from the leaf node representing the storage device 127 to a parent node to said leaf node, e.g., a function node representing a data durability volume. In response to the node representing the data durability volume receiving the event, storage node 120 may rebalance the load on storage device 127, such as moving the load on storage device 127 to another storage device.

In some examples, volume graph 135 may be used to modify volume 121 when one or more parameters used to allocate the volume 121 are changed. Volume 121 can be allocated with a specified set of one or more parameters (e.g., block size, encryption keys, compression scheme, volume size, data protection scheme, etc.). For example, a volume can be allocated with a specified data protection scheme, such as erasure coding replication, none, etc. In some examples, the one or more parameters may be changed after creation of the volume 121. In these examples, new parameters are validated, and a clone of the volume is created with the new parameters. Storage node 120 may then attach to the clone of the volume created with the new parameters.

Modules illustrated in FIG. 1B (e.g., storage services module 132) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 2A is a block diagram illustrating a system 201 having a data processing unit (DPU) 210 configured to support graph-based storage management, in accordance with the techniques described in this disclosure. In the illustrated example of FIG. 2A, system 201 also includes CPU 240 communicatively coupled to DPU 210. Each of DPU 210 and CPU 240 generally represents a hardware chip implemented in digital logic circuitry. DPU 210 may operate substantially similar to any of the nodes 17 of FIG. 1A and DPUs 117 of FIG. 1B.

DPU 210 can be implemented as a highly programmable I/O processor with a plurality of processing cores (as discussed below, e.g., with respect to FIG. 2B). In the illustrated example of FIG. 2A, DPU 210 includes a network interface (e.g., an Ethernet interface) to connect directly to a network, and a plurality of host interfaces (e.g., PCI-e interfaces) to connect directly to one or more application processors (e.g., CPU 240) and one or more storage devices (e.g., SSDs). DPU 210 also includes a data plane operating system (OS) 212 executing on two or more of the plurality of processing cores. Data plane OS 212 provides data plane 214 as an execution environment for a run-to-completion software function invoked on data plane OS 212 to process a work unit. A work unit is associated with one or more stream data units (e.g., packets of a packet flow) and specifies the software function for processing the stream data units and at least one of the plurality of processing cores for executing the software function.

The software function invoked to process the work unit may be one of a plurality of software functions for processing stream data. The software functions can be included in a library 220 provided by data plane OS 212. In the illustrated example, library 220 includes network functions 222, storage functions 224, security functions 226, and analytics functions 228. Network functions 222 may, for example, include network I/O data processing functions related to Ethernet, network overlays, networking protocols, encryption, and firewalls. Storage functions 224 may, for example, include storage I/O data processing functions related to NVME (non-volatile memory express), compression, encryption, replication, erasure coding, and pooling. Security functions 226 may, for example, include security data processing functions related to encryption, regular expression processing, and hash processing. Analytics functions 228 may, for example, include analytical data processing functions related to a customizable pipeline of data transformations.

In general, data plane OS 212 can be implemented as a low level, run-to-completion operating system running on bare metal of DPU 212 that runs hardware threads for data processing and manages work units. As described in more detail below, data plane OS 212 can include the logic of a queue manager to manage work unit interfaces, enqueue and dequeue work units from queues, and invoke a software function specified by a work unit on a processing core specified by the work unit. In a run-to-completion programming model, data plane OS 212 is configured to dequeue a work unit from a queue, process the work unit on the processing core, and return the results of processing the work unit to the queues.

DPU 210 also includes a multi-tasking control plane operating system 232 executing on one or more of the plurality of processing cores. In some examples, the multi-tasking control plane operating system 232 may comprise Linux, Unix, or a special-purpose operating system. In some examples, as illustrated in FIG. 2A, control plane OS 232 provides a control plane 216 including a control plane software stack executing on data plane OS 212. As illustrated, the control plane software stack includes a hypervisor 230, the multi-tasking control plane OS 232 executing on hypervisor 230, and one or more control plane service agents 234 executing on control plane OS 232. Hypervisor 230 may operate to isolate control plane OS 232 from the work unit and data processing performed on data plane OS 212. Control plane service agents 234 executing on control plane OS 232 comprise application-level software configured to perform set up and tear down of software structures to support work unit processing performed by the software function executing on data plane OS 212. In the example of data packet processing, control plane service agents 234 are configured to set up the packet flow for data packet processing by the software function on data plane OS 212 and tear down the packet flow once the packet processing is complete. In this way, DPU 210 comprises a highly programmable processor that can run application-level processing while leveraging the underlying work unit data structure for parallelized stream processing.

In another example, instead of running on top of data plane OS 212, the multi-tasking control plane OS may run on one or more independent processing cores that are dedicated to the control plane OS, where the one or more independent processing cores are different than the processing cores executing data plane OS 212. In this example, if an independent processing core is dedicated to the control plane OS at the hardware level, a hypervisor may not be included in the control plane software stack. Instead, the control plane software stack running on the independent processing core may include the multi-tasking control plane OS and one or more control plane service agents executing on the control plane OS.

CPU 240 is an application processor with one or more processing cores for computing-intensive tasks. In the illustrated example of FIG. 2A, CPU 240 includes a plurality of host interfaces (e.g., PCI-e interfaces) to connect directly to DPU 210. CPU 240 includes a hypervisor/OS 242 that supports one or more service agents 246 and one or more drivers 247. As illustrated in FIG. 2A, CPU 240 may also include a virtual machine (VM) OS 244 executing on top of hypervisor/OS 242 that supports one or more drivers 248. Application-level software, such as agents 246 or drivers 247 executing on OS 242 or drivers 248 executing on VM OS 244 of CPU 240, may determine which data processing tasks to offload from CPU 240 to DPU 210. For example, hypervisor/OS 242 of CPU 240 may offload data processing tasks to DPU 210 using physical functions (PFs) and/or virtual functions (VFs) of PCIe links. In some implementations, VM OS 244 of CPU 240 may offload data processing tasks to DPU 210 using VFs of PCIe links.

In the illustrated example of FIG. 2A, system 201 also includes a controller 200 in communication with both DPU 210 and CPU 240 via a control application programming interface (API). Controller 200 may provide a high-level controller for configuring and managing application-level software executing on a control plane OS of each of DPU 210 and CPU 240. For example, controller 200 may configure and manage which data processing tasks are to be offloaded from CPU 240 to DPU 210. In some examples, controller 200 may comprise a software-defined networking (SDN) controller, which may operate substantially similar to controller 130 of FIGS. 1A and 1B. In some examples, controller 200 may operate in response to configuration input received from a network administrator via an orchestration API.

Data plane OS 212 of DPU 210 is configured to receive stream data units for processing on behalf of the application-level software executing on hypervisor/OS 242 of CPU 240. In the example of packet processing, the stream data units may comprise data packets of packet flows. In this example, the received packet flows may include any of networking packet flows, storage packet flows, security packet flow, analytics packet flows, or any combination thereof. Data plane OS 212 executing on one of the processing cores of DPU 210 may receive each of the packet flows in the form of one or more work units from a networking unit, host unit, or another one of the processing cores (as discussed below, e.g., with respect to FIG. 2B) of DPU 210. Each of the work units for a received packet flow may be associated with one or more data packets of the packet flow. Upon receipt of the packet flow, data plane OS 212 can perform a lookup in a flow table to determine that the packet flow is legitimate and can map the packet flow to one of the processing cores of DPU 210 for serialized processing of the packets of the packet flow. The flow table may comprise a hardware implemented flow table that is updated and maintained with legitimate packet flows by control plane 216 and used to assign processing cores to packet flows.

In the case where the received packet flow is not recognized by data plane OS 212 (e.g., the packet flow is not yet set up in the flow table), data plane OS 212 may send the packet flow through the slow path in control plane 216 for set up. Control plane service agents 224 executing on control plane OS 232 can then determine whether the packet flow is legitimate and send an instruction to data plane OS 212 to set up the packet flow in the flow table.

Once the packet flow is set up by control plane service agents 234, data plane OS 212 may assign the packet flow to a particular processing core of DPU 210 that can do stream processing for the packet flow. As one example, data plane OS 212 may execute a queue manager configured to receive a work unit associated with one or more data packets of the packet flow, enqueue the work unit to a work unit queue associated with the processing core for the packet flow, dequeue the work unit from the work unit queues to the processing core, and invoke the software function specified by the work unit on the processing core for processing the work unit.

Data plane OS 212 also provides interfaces to one or more hardware accelerators of DPU 212 (as discussed below, e.g., with respect to FIG. 2B) configured to perform acceleration for various data processing functions. Data plane OS 212 may use the hardware accelerators to process one or more portions of the packet flow, i.e., one or more work units, arranged as a work unit (WU) stack. In the WU stack, a work unit can include an identifier of a subsequent work unit within the WU stack for further processing of the packets upon completion of the work unit. To perform stream processing for the packet flow, a hardware accelerator can be configured to perform one or more hardware commands included in the WU stack as input parameters of the first work unit and, upon completion of the one or more hardware commands, proceed to the subsequent work unit within the WU stack identified by the current work unit.

As described herein, the DPU utilizes fine-grain work units, work unit queues, and a queue manager executed on the data plane operating system of each processing core to serialize packet processing such that data packets of a same packet flow are processed by a same processing core. In this way, the DPU is capable of processing any type of packet flow with fine granularity between processing cores and low processing overhead. For comparison, other multi-core systems may communicate using shared memory and locking to provide coherency in memory. The locking schemes may be an order(s) of magnitude larger grain than the work unit scheme described herein. For example, the processing overhead associated with the work unit scheme can be less than 100 clock cycles in some implementations. Processing overhead may include the number of cycles to implement a work unit and the number of cycles to dequeue and deploy the work unit to a given processing core for processing. Serializing packet processing on the given run-to-completion hardware thread to maintain synchronization, as described herein, can result in roughly the same overhead as the locking schemes used in conventional multi-core systems.

In accordance with the techniques described in this disclosure, controller 200 may include a graph generation module 280 for generating a graph-based representation of the functional elements in data plane 214 of a volume (e.g., volume 121J of FIG. 1B). Graph generation module 280 may operate substantially similar to graph generation module 131 of FIGS. 1A and 1B. In this example, graph generation module 280 may generate a volume graph including function nodes that represent one or more functions, such as storage functions 224, and leaf nodes that represent resources allocated for said function(s). Control plane 216 of DPU 210 may include graph module 284 configured to convey information based on a volume graph to each DPU to manage the storage cluster and to use the volume graph to manage the volume. As described herein, the volume graph may be used to change the functionality of the volume by replacing a function node in the volume graph with another function node to achieve a different scheme of data protection, data availability, data compression, and/or any other function.

In some examples, the volume graph enables the implementation of failover for the volume. For example, DPU 210 may operate as a secondary storage node for the volume. In response to a failure of a primary storage node, graph generation module 280 may generate the volume graph for DPU 210 to assume the role as the primary storage node for the volume.

In some examples, graph module 284 may use the volume graph for resource allocation. For example, graph module 284 may apply one or more rules to the leaf nodes of the volume graph to allocate resources to the volume. The rules may include resource availability (e.g., IOPs availability, storage capacity availability), data protection (e.g., resources in different fault domains), and/or load balancing rules (e.g., based on IOP usage, storage usage, etc.).

In some examples, graph module 284 may use the volume graph for event management. Events may include a storage node going down, a storage device being pulled out, the deletion of a volume, and/or any other event associated with the allocated volume represented by the volume graph. For example, graph module 284 may determine that an event generated by a leaf node of the graph (e.g., storage device) is propagated up the layers of the volume stack of the volume graph to a function node that represents a data durability operation of the volume. In response, graph module 284 may instruct DPU 210 to send a message to controller 200 to inform controller 200 of the event. In response to receiving the message, graph generation module 280 of the controller 200 may rebuild the volume graph by replacing the one or more leaf nodes of the function node representing the data durability operation with another storage device.

In some examples, graph module 284 may use the volume graph to modify the volume based on changes in volume parameters. As described herein, a volume can be created with a specified set of one or more parameters (e.g., block size, encryption keys, compression scheme, volume size, data protection scheme, etc.). For example, a volume can be created with a specified data protection scheme, such as erasure coding replication, none, etc. In some examples, volume parameters may be changed after creation of the volume. In these examples, graph module 284 may use the volume graph to generate a clone of the volume with the modified parameters and to switch the host connection to the clone of the volume.

In some examples, graph module 284 may use the volume graph to dynamically rebalance resources for the volume. For example, graph module 284 may rebalance resources for the volume based on alerts generated by leaf nodes of the volume graph. For example, the storage usage of a storage device represented by a leaf node in the volume graph may exceed a storage usage threshold and may generate an alert that is propagated up the layers of the volume stack of the volume graph to a function node that represents a data durability operation of the volume and, in response, graph module 284 may move the load from the storage device to a new storage device.

FIG. 2B is a block diagram illustrating hardware components of an example data processing unit 210, in accordance with the techniques of this disclosure. DPU 210 generally represents a hardware chip implemented in digital logic circuitry. DPU 210 may operate substantially similar to any of nodes 17 of FIG. 1A and DPUs 117 of FIG. 1B. Thus, DPU 210 may be communicatively coupled to a CPU, a GPU, one or more network devices, server devices, random access memory, storage media (e.g., SSDs), a data center fabric, or the like, e.g., via PCI-e, Ethernet (wired or wireless), or other such communication media.

In the illustrated example of FIG. 2B, DPU 210 includes a plurality of programmable processing cores 250A-250N ("cores 250"). DPU 210 may operate substantially similar to DPU 210 of FIG. 2A with the run-to-completion data plane OS 212 executing on each of cores 250. Each of cores 250 includes a respective level 1 (L1) cache of L1 caches 251A-251N ("caches 251"). Caches 251 may include L1 buffer caches for caching non-coherent data, such as stream data units (e.g., packets or other data for stream processing). L1 buffer caches may store data for short-term caching such that the data is available for fast access.

In the illustrated example of FIG. 2B, DPU 210 also includes a networking unit 252, a coherent memory manager 254, a non-coherent memory manager 255, one or more host units 256, a plurality of accelerators 258A-258N ("accelerators 258"), a queue manager 260, and a plurality of work unit (WU) queues 262. Although not illustrated in FIG. 2B, each of cores 250, networking unit 252, coherent memory manager 254, non-coherent memory manager 255, host units 256, accelerators 258, queue manager 260, and WU queues 262 can be communicatively coupled to each other.

In the example of FIG. 2B, DPU 210 represents a high performance, hyper-converged network, storage, and data processor and input/output hub. For example, networking unit 252 may be configured to send and receive stream data units with one or more external devices, e.g., network devices. Networking unit 252 may perform network interface card functionality, packet switching, and the like. Networking unit 252 may use large forwarding tables and offer programmability. Networking unit 252 may expose network interface (e.g., Ethernet) ports for connectivity to a network, such as network 7 and/or switch fabric 114 of FIG. 1A. Each of host units 256 may expose one or more host interface (e.g., PCI-e) ports to send and receive stream data units with application processors (e.g., an x86 processor of a server device or a local CPU or GPU of the device hosting DPU 210) and/or data storage devices (e.g., SSDs). DPU 210 may further include one or more high bandwidth interfaces for connectivity to off-chip external memory (not illustrated in FIG. 2B).

Each of accelerators 258 may be configured to perform acceleration for various data processing functions, such as lookups, matrix multiplication, cryptography, compression, regular expression processing, or the like. For example, accelerators 258 may comprise hardware implementations of lookup engines, matrix multipliers, cryptographic engines, compression engines, regular expression interpreters, or the like. In some examples, accelerators 258 may include a data durability unit that may be used to implement one or more data durability and/or data reliability schemes. In some examples, such a data durability unit may be configured to perform matrix multiplication operations commonly performed in erasure coding schemes, such as Reed Solomon erasure coding schemes. Such a data durability unit may be configured to efficiently perform operations, such as those relating to Galois Field mathematics, that might be difficult and/or inefficient to perform using commonly available processors or other processing hardware. Further, such a data durability unit may be designed to perform and/or implement multiple different types of data durability schemes by configuring different matrices specific to each implementation.

Queue manager 260 is configured to maintain and manipulate WU queues 262. At least one of WU queues 262 may be associated with at least one of cores 250 and may be configured to store a plurality of work units enqueued for processing on the respective core(s) 250 to which it is associated. In some examples, each of cores 250 may have a dedicated one of WU queues 262 that stores work units for processing by the respective o core 250. In other examples, each of cores 250 may have two or more dedicated WU queues 262 that store work units of different priorities for processing by the respective core 250. In the illustrated example of FIG. 2B, queue manager 260 and WU queues 262 are both physically centralized with respect to cores 250. WU queues 262, however, may be logically decentralized.

In some examples, data processing unit 210 may utilize two types of on-chip memory or memory devices, namely coherent cache memory and non-coherent buffer memory (not shown in FIG. 2B). Coherent memory manager 254 is configured to control access to the coherent cache memory, and non-coherent memory manager 255 is configured to control access to the non-coherent buffer memory. In this way, any of the components of data processing unit 210

(e.g., cores 250, networking unit 252, host units 256, accelerators 258, queue manager 260, and WU queues 262) and any number of external devices (e.g., network devices, servers, external storage devices, or the like) may access the coherent cache memory via coherent memory manager 254 and access the non-coherent buffer memory via non-coherent memory manager 255. Memory managers 254, 255 may be configured to perform a number of operations to perform memory management in accordance with the present disclosure. More details on a bifurcated memory system that may be included in DPU 217 are available in U.S. Pat. No. 10,565,112, filed Apr. 10, 2018, and titled "Relay Consistent Memory Management in a Multiple Processor System," the entire content of which is hereby incorporated by reference for all purposes.

Cores 250 may comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or complex instruction set computing (CISC or x86) cores. Each of cores 250 may be programmed to process one or more events or activities related to a given packet flow such as, for example, a networking packet flow, a storage packet flow, a security packet flow, or an analytics packet flow. Each of cores 250 may be programmable using a high-level programming language, e.g., C, C++, or the like.

In some examples, the plurality of cores 250 executes instructions for processing a plurality of events related to each data packet of a packet flow, which can be received by networking unit 252 or host units 256 in a sequential manner in accordance with one or more work units associated with the data packets. As described above, work units are sets of data exchanged between cores 250 and networking unit 252 or host unit 256 where each work unit may represent one or more of the events related to a given data packet. More specifically, a work unit is associated with one or more data packets. A work unit specifies a software function for processing the data packets and further specifies one of cores 250 for executing the software function.

In general, to process a work unit, the core 250 specified by the work unit can be configured to retrieve the data packets associated with the work unit from a memory and execute the software function specified by the work unit to process the data packets. For example, the core 250 may retrieve the data packets from the non-coherent memory buffer via non-coherent memory manager 255 and may cache the data packets in a cache 251 within the respective core 250.

In a more detailed example, receiving a work unit can be signaled by receiving a message in a work unit receive queue (e.g., one of WU queues 262). Each of WU queues 262 is associated with at least one of cores 250 and is addressable in the header of the work unit message. Upon receipt of the work unit message from networking unit 252, one of host units 256, or another one of cores 250, queue manager 260 enqueues a work unit in the one of WU queues 262 associated with the one of cores 250 specified by the work unit. After queue manager 260 dequeues the work unit from a WU queue 262, queue manager 260 delivers the work unit to the associated core 250. Queue manager 260 then invokes the software function specified by the work unit on the associated core 250 for processing the work unit.

To process the work unit, a core 250 receives the work unit from a WU queue 262. The core 250 then fetches the packets associated with the work unit from the cache 251 within the respective core 250 and executes the invoked software function to process the packets. The core 250 then outputs the corresponding results of processing the work unit back to WU queues 262. For example, upon processing the work unit, the core 250 may generate a new work unit message by executing stored instructions to addresses mapped to a work unit transmit queue (e.g., another one of WU queues 262). The stored instructions write the contents of the message to the queue. The release of a work unit message from the core 250 may be interlocked with (gated by) flushing of dirty data from the associated cache 251.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first core 250, e.g., core 250A, may process a first event of the plurality of events. Moreover, first core 250A may provide to a second core 250, e.g., core 250B, a first work unit of the work units. Furthermore, second core 250B may process a second event of the plurality of events in response to receiving the first work unit from first core 250A.

Figure 3A:
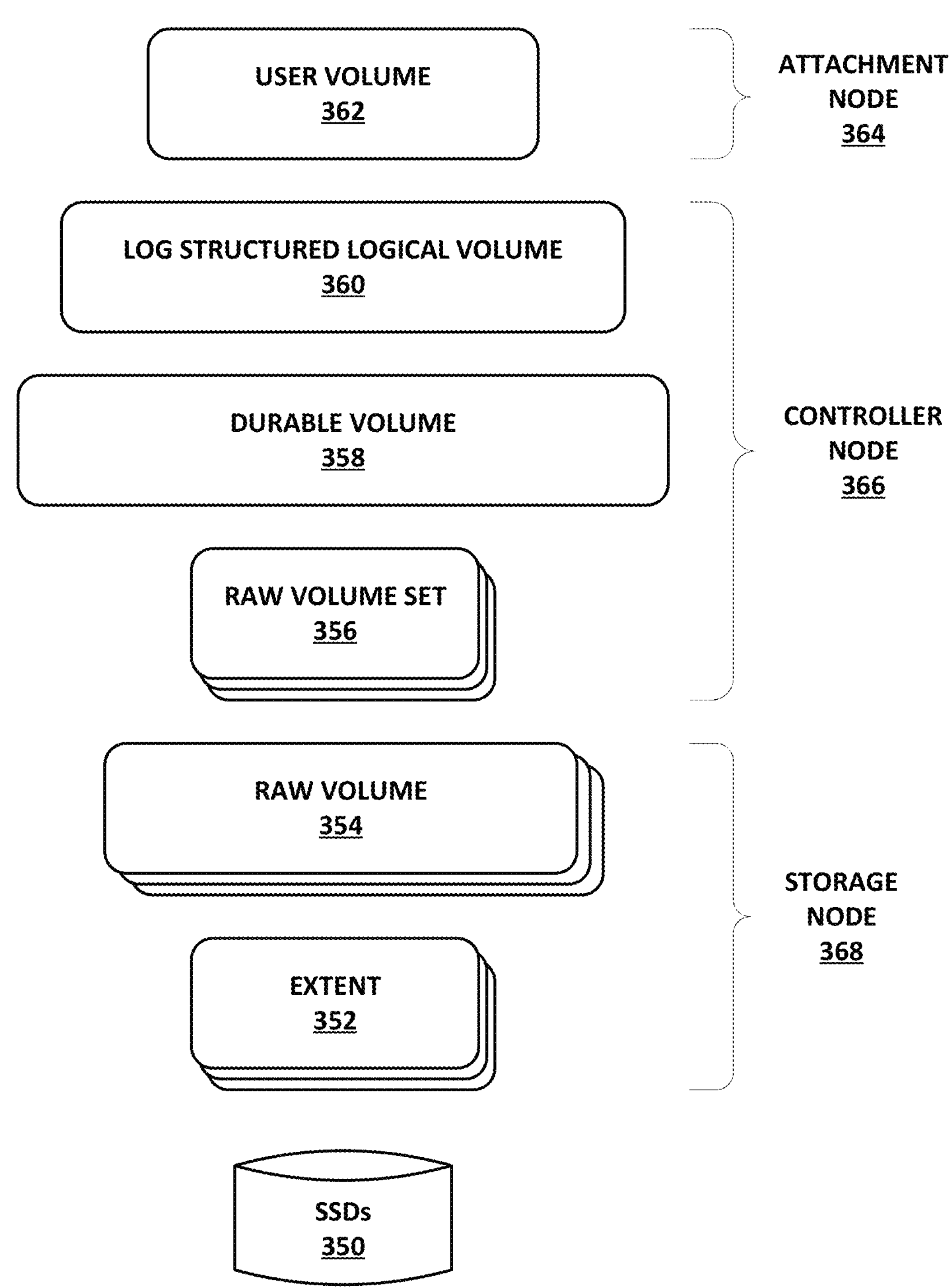
FIG. 3A is a conceptual diagram illustrating an example object model of a data plane of an allocated volume, in accordance with the techniques described in this disclosure.

FIG. 3A is a conceptual diagram illustrating an example object model for a data plane of a volume, in accordance with the techniques of this disclosure. As illustrated in FIG. 3A, the volume (e.g., volume 121J of FIG. 1B) provides layers of abstraction from SSDs 350. SSDs 350 may be a logically common pool of storage devices created by nodes interconnected in a storage cluster of a data center and accessible by all nodes coupled to a switch fabric of the data center. The layers of abstraction of the allocated volume include multiple extent layers 352 that each maps to a portion of one of SSDs 350, multiple raw volume layers 354 that each maps to a number of extents 352, multiple raw volume set layers 356 that each maps to a number of raw volumes 354, a durable volume layer 358 that maps to multiple raw volume sets 356, a log structured logical volume layer 360 that maps to durable volume 358, and a user volume 362 that maps to log structured logical volume 360. The distribution of data may occur at two boundaries: 1) user volume 362 to log structured logical volume 360, and 2) raw volume set 356 to raw volume 354. In some examples, the allocated volume can configure user volume 362 to strip/concatenate the user volume to multiple logical volumes, thereby providing a 1:N mapping of user volume to logical volumes. This may, for example, facilitate scaling of user volumes across multiple DPUs as well as scale recovery when a storage device fails.

More information about each of the layers of abstraction (from application to device) is set forth in FIG. 3B and as described in U.S. Pat. No. 10,949,303, entitled "DURABLE BLOCK STORAGE IN DATA CENTER ACCESS NODES WITH INLINE ERASURE CODING," filed 10 Dec. 2018, which claims the benefit of U.S. Provisional Patent Application No. 62/597,185, filed 11 Dec. 2017, the entire contents of which is incorporated herein by reference for all purposes. Although not shown in the examples of Table 1, as noted above, the user volume may, in some implementations, map to 1:N logical volumes.

In the illustrated examples of FIGS. 3A and 3B, there are three types of roles that a node may implement in the layering scheme. Based on the deployment topology (e.g., hyper-converged vs. disaggregated) and the placement of data, a given node may play one or all roles for a given volume. One type of role that a node may implement is an attachment node 364. The attachment node 364 is the node where an application running as a virtual machine or container on a server attaches to the volume. For example, the attachment node 364 may be the node where the PCIe link to the server is attached or where the NVMEoF (non-volatile memory express over fabrics) connection is terminated for the volume. The user volume 362 function runs on the attachment node.

Another type of role that a node may implement is a primary/backup controller node 366. The volume includes a primary controller node and, in some examples such as for durable volumes (e.g., erasure coded volume, replication volume, etc.), at least one backup controller node. A primary and backup scheme may be used to provide data consistency and availability in the presence of node failures. The primary controller node creates a transaction journal that is replicated to the one or more backup controller nodes. If the primary controller node fails, a new primary controller node can be elected from the one or more backup controller nodes by the control plane (e.g., control plane 216 from FIG. 2A), and the transactions are rolled forward before allowing user requests to any blocks that have outstanding transactions. In the illustrated example of FIG. 3A, the log structured logical volume 360, durable volume 358, and raw volume set 356 functions run on the controller nodes 366.

Another type of role that a node may implement is a storage node 368. The storage node 368 is the node to which a storage device is attached. The volume may include a plurality of storage nodes 368. For example, SSDs 350 can be partitioned into extents 352 (e.g., 1 GB) and accessed via the storage node 368 that is attached to the SSDs 350 via PCIe. Extents 252 are provisioned into a raw volume 354 that is remotely accessible by other nodes interconnected in a cluster. In the illustrated example of FIG. 3A, raw volume 354 and extent 352 functions run on the storage nodes 368.

A volume can be configured with the following steps via a management plane and control plane. Each configuration step includes a communication from the management plane to one or more nodes instructing the node(s) about their role(s) relative to the volume being created. Volumes can each have a globally unique identifier that is used in the communication so that each node can identify the correct volume. The management plane may use a variety of methods to determine which nodes to select to play the different roles for the given volume. In general, the management plane may select nodes that are outside of a same fault zone within a cluster so that multiple nodes used to support the volume are not likely to fail together. An example method for configuring a volume is described below.

As a first step, the management plane receives a top-level specification from a management console (e.g., Openstack Cinder) that defines volume parameters including block size, volume size (number of blocks) (otherwise referred to as "capacity"), quality of service (QoS), encryption, compression, fault domains, and durability scheme (e.g., replication factor or erasure coding scheme).

As a second step, the management plane creates raw volumes 354 on each storage node. Raw volumes 354 can be created by assigning extents 352 from available SSDs 350. Extents 352 may be statically sized (e.g., 1 GB) during deployment. This step may be done statically or dynamically (e.g., thin provisioning) as the storage space is accessed by the storage node.

As a third step, the management plane creates raw volume sets 356 on each controller node. The number of raw volumes per raw volume set 356 may depend on the durability scheme specified in the top-level specification for the volume (e.g., X for replication factor and m+n for erasure coding). The number of raw volume sets 356 may depend on the size of the raw volumes 354 and the size specified in the top-level specification for the volume.

As a fourth step, the management plane creates durable volume 356 on each controller node. Parameters for durable volume 356 can include durability scheme (e.g., replication or erasure coding) and/or volume size (including additional space to allow for log compaction).

As a fifth step, the management plane creates log structured logical volume 360 on each controller node. Parameters for log structured logical volume 360 can include chunk size, volume size, and compaction related parameters. Log structured logical volume 360 can be a logical volume management (LVM) compatible volume type in the data plane storage stack. Log structured logical volume 360 provides fault resiliency and flash optimization for the volume and can also provide flash optimization for a raw block device without resilience. Log structured logical volume 360 may be used to gather multiple data blocks into larger chunks of data for durable volume 356 prior to storage across multiple storage nodes. Note that primary and backup controller nodes can be managed by a control plane (e.g., control plane 216 of FIG. 2A) separate from the creation by the management plane.

As a sixth step, the management plane creates user volume 362 on each attachment node. User volume 362 can receive the read and write requests for data blocks from an application running on an attached server. The read and write requests can be passed to log structured volume 360 for processing. Parameters for user volume 362 can include block size, encryption keys, compression scheme, and volume size.

Once created, the volume may rely on a distribution protocol to exchange data between the associated nodes. For example, NVMEoF may be used as the base protocol. The network binding may be based on transmission control protocol (TCP) or some form of reliable datagram. In some examples, the network binding may be TCP with fabric control protocol (FCP) based congestion control.

Various objects may have a universally unique identifier (UUID) that allows them to be addressable across the network via the distribution protocol. For example, log structured logical volume 360 may be accessed using an UUID from the attachment node or directly via an NVMEoF client. In another example, raw volumes 354 may receive I/O requests from raw volume sets 356 for replicas or erasure coded pieces storage in raw volumes 354 identified by UUIDs. In some examples, authentication may be included as a part of NVMEoF so that a "bad actor" (non-authorized party) on the network cannot access these remotely addressable entities.

In some examples, the volume designs described in this disclosure may support a scale-down model all the way down to a single node. In this case, the raw volumes 354 can be allocated from the local node resulting in a device that is similar to a RAID (redundant array of independent disks) or an embedded erasure code implementation that is still tolerant of SSD failures.

Figure 4:
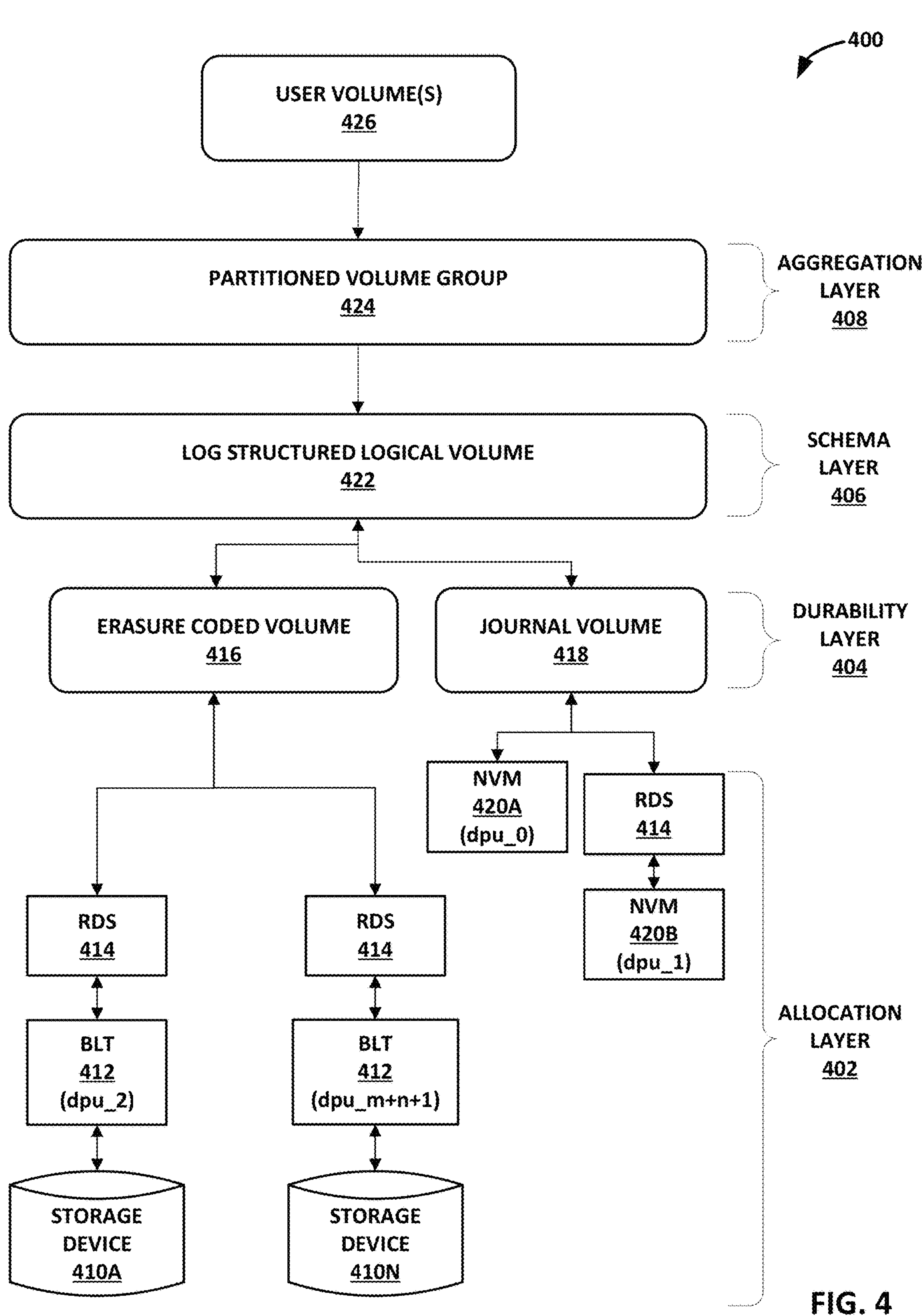
FIG. 4 illustrates an example graph-based representation of functional elements in a data plane of a volume, in accordance with the techniques described in this disclosure.

FIG. 4 illustrates an example graph-based representation of functional elements in a data plane of a volume, in accordance with the techniques described in this disclosure. Volume graph 400 of FIG. 4 is described with respect to an example implementation of a volume, such as volume 121J as described above with respect to FIG. 1B. Volume graph 400 may be used for management of the volume, such as resource allocation, event management, and recovery at scale. Volume graph 400 may span multiple nodes enabling scale-out capacity, redundancy, and performance.

In the example of FIG. 4, volume graph 400 provides a graphical representation of the layers of abstraction of the volume. For example, volume graph 400 may include an allocation layer 402, durability layer 404, schema layer 406, and aggregation layer 408 of the volume. Allocation layer 402 of volume graph 400 may graphically represent the resources allocated for one or more durable volumes, e.g., erasure coded volume 416 and journal volume 418. Journal volume 418 provides crash resilience for the volume. For example, log structured logical volume 422 may use an intent log (i.e., journal) stored in NVM 420 of a DPU so that any write that is acknowledged to the host server for the application can be reliably performed to the underlying storage media in the presence of component failures. The journal can be replicated to another DPU to provide resilience to a node failure. Volume graph 400 may graphically represent the nodes allocated for journal volume 418. For example, volume graph 400 may include a leaf node of journal volume 418 that represents a node operating as a primary storage node (e.g., dpu_0) including a first copy of the journal stored in NVM 420A. Volume graph 400 may include another leaf node of journal volume 418 that represents a node operating as a secondary storage node (e.g., dpu_1) including a second copy of the journal in NVM 420B. In this example, the primary storage node (e.g., dpu_0) may represent DPU 117A of FIG. 1B having a copy of the journal of volume 121J stored in NVM of storage node 120A, and the secondary storage node may represent DPU 117B of FIG. 1B having a copy of the journal of volume 121J stored in NVM of storage node 120B.

Erasure coded volume 416 provides a data protection technique in which data is broken into fragments, expanded, and encoded with a configurable amount of redundant data pieces that can be stored across a set of storage devices. Erasure coding provides reliability by enabling data that becomes corrupted at one storage location to be reconstructed using information about the data that is stored at another storage location. In this example, volume graph 400 may graphically represent the nodes operating as storage nodes that provide access to raw volumes created on each of the storage nodes for erasure coded volume 416. For example, volume graph 400 may include one or more leaf nodes of erasure coded volume 416 that represent nodes operating as storage nodes (e.g., dpu_2 through dpu_m+n+1) that provide access to raw volumes created by assigning extents from storage devices 410A-410N (collectively, "storage devices 410"). Storage devices 410 may represent storage devices 127 within storage nodes 120A, 120B, and 120D. The storage nodes that provide access to the raw volumes are illustrated as block local thins (BLTs) 412 in volume graph 400. The number of raw volumes per raw volume set may depend on the durability scheme (e.g., "m+n" for erasure coding or "X" for replication), which can be specified in the top-level specification for the volume. In some examples, volume graph 400 may include one or more nodes for erasure coded volume 416 that represent remote datagram sockets (RDS), e.g., RDS 414, that each provides remote access to raw storage volumes. Although erasure coded volume 416 is illustrated as including RDS 414, in some examples, erasure coded volume 416 may include RDS 414 and BLT 412, only BLT 412, or a combination of the two. In some examples, journal volume 418 may include one or more leaf nodes that represent RDS that provide remote access to the copies of the journal stored in NVM 420.

Durability layer 404 of volume graph 400 may graphically represent one or more durable volumes of a volume, such as, in the example of FIG. 4, erasure coded volume 416 and journal volume 418. Although volume graph 400 is illustrated with erasure coded volume 416 and journal volume 418, volume graph 400 may additionally or alternatively include other durable volumes, such as a replication volume in which data blocks are replicated a number of times based on a replication factor and distributed across the storage devices to provide high data availability to protect against device and/or node failures. In this example, volume graph 400 includes a function node that represents erasure coded volume 416 and is connected to the leaf nodes that represent the raw volumes created from storage devices 410 (or to the RDS that provides remote access to the raw volumes). Volume graph 400 also includes a function node that represents journal volume 418 that is connected to nodes that represent NVMs 420 including copies of the journal (or to the RDS that provides remote access to a copy of the journal).

Schema layer 406 of volume graph 400 may graphically represent a log structured logical volume 422 created on each node operating as a controller node. As described above, log structured logical volume 422 can be used to gather multiple data blocks into larger chunks for inline erasure coding by erasure coded volume 416 prior to storage across multiple storage nodes. Volume graph 400 includes a function node that represents log structured logical volume 422 and is connected to nodes that represent the durable volumes, e.g., erasure coded volume 416 and journal volume 418. Although volume graph 400 is illustrated with log structured logical volume 422, volume graph 400 may include other volumes, such as a direct mapping volume or the like.

Aggregation layer 408 of volume graph 400 may graphically represent a partitioned volume group 424. Partitioned volume group 424 may group a plurality of log structured logical volumes (not shown) to create a storage volume or split a log structured logical volume into a plurality of storage volumes. Volume graph 400 includes a function node that represents partitioned volume group 424 that is connected to a node that represents the log structured logical volume 422.

Volume graph 400 includes a node in the graph that represents a user volume, e.g., user volume 426, created on a node operating as an attachment node (e.g., initiator node 110 of FIG. 1B). For ease of illustration, volume graph 400 is described with respect to a single user volume 426 but may, in some examples, include a plurality of user volumes. As described above, user volume 426 receives read and write requests for data blocks from an application running on an attached server and passes the read and write requests to log structured volume 422 for processing. In some examples, a plurality of user volumes may use the volume represented by volume graph 400. In these examples, volume graph 400 may include a plurality of root nodes that represent the plurality of user volumes that use the volume.

The control plane may configure a volume graph using APIs that map the parameters used to create the volume to a volume graph, e.g., volume graph 400. The APIs are referred to herein as "volume create intent APIs." For example, the volume create intent APIs may include a volume type parameter specifying the type of volume to be created. For example, the volume type parameter may specify a replication volume (e.g., VOL_TYPE_BLK_REPLICA), erasure coded volume (VOL_TYPE_BLK_EC), block local thin volume (VOL_TYPE_BLK- _LOCAL_THIN), raw volume (VOL_TYPE_BLK_RF1), etc. In some examples, the volume create intent APIs may include a data protection parameter that specifies the parameters for data protection techniques to be implemented for the volume, such as a number of storage nodes going down that can be tolerated (Num_redundant_dpus), a number of data disks for an erasure coded volume (Num_data_disks), a number of media failures that can be tolerated (Num_failed_disks), or the like. In some examples, the volume create intent APIs may include a compression parameter that specifies whether compression is enabled for the volume. The volume create intent APIs may, in some examples, include an encryption parameter that specifies whether encryption is enabled for the volume. In some examples, the volume create intent APIs may include a capacity parameter that specifies the size of the volumes. In some examples, the volume create intent APIs may include a QoS parameter that specifies the QoS requirements for the volume. The volume create intent APIs may, in some examples, include a fault domain parameter that specifies the fault domains that a volume may or may not be created in. In some examples, the volume create intent APIs may include a Cyclic Redundancy Check (CRC) parameter that specifies whether CRC is enabled for the volume.

As described below, the control plane may use volume graph 400 for resource allocation, event management, recovery at scale, and various other functions. In some examples, the control plane may replace a function node in volume graph 400 with another function node to achieve a different scheme of data protection, data availability, and/or data compression. For example, erasure coded volume 416 in volume graph 400 may be replaced by a function node that represents a replication volume to apply a different kind of data protection scheme for the volume. In this example, the control plane may reconfigure volume graph 400 to include a function node that represents the replication volume and connect the replication volume to leaf nodes that represent the resources allocated for the replication volume without affecting the other nodes within volume graph 400. In some examples, the composability of volume graph 400 enables the implementation of failover for the volume. As further described in FIGS. 7A-7B below, the control plane may, in response to determining that a primary storage node (e.g., dpu_0) has failed, reconfigure volume graph 400 to replace a connection to the failed primary storage node with a connection to a secondary storage node (e.g., dpu_1) to assume the role as a primary storage node for the volume.

In some examples, the control plane may use volume graph 400 for resource allocation. For example, the control plane may apply one or more rules to the leaf nodes of volume graph 400 to allocate resources to the volume. The rules may include a resource availability, data protection, and/or load balancing rules.

In some examples, the control plane may apply a resource availability rule to allocate resources based on one or more rules. The rules can be based on one or more metrics, such as input/output operations per second (IOPs) availability (e.g., how fast the system can read and write commands in a second). For example, to allocate storage devices and/or storage nodes for erasure coded volume 416, the control plane may determine whether a given storage device or given storage node has enough IOPs available for erasure coded volume 416, such as by comparing the IOP of the given storage device or given storage node to an IOP availability threshold. The control plane may select one or more storage devices or nodes determined to have enough IOPs available (e.g., satisfies the IOPs availability threshold) to be allocated for erasure coded volume 416. Volume graph 400 can be configured such that leaf node(s) of erasure coded volume 416 represents the allocated storage device(s) and/or storage node(s) determined to have enough IOPs available.

In some examples, the control plane may apply a resource availability rule to allocate resources based on one or more rules, such as storage capacity availability. For example, to allocate storage devices for erasure coded volume 416, the control plane may determine whether a given storage device has enough storage capacity available for erasure coded volume 416, such as by comparing the storage capacity availability of the given storage device to a storage capacity availability threshold. The control plane may select one or more storage devices determined to have enough storage capacity available (e.g., satisfies the storage capacity availability threshold) to be allocated for erasure coded volume 416. Volume graph 400 can be configured such that leaf node(s) of erasure coded volume 416 represents the allocated storage device(s) determined to have storage capacity available.

In some examples, the control plane may apply a data protection rule to allocate storage nodes that are in different fault zones within a cluster so that multiple storage nodes used to support the volume are not likely to fail together. For example, to allocate storage nodes for journal volume 418, the control plane may determine the fault zones (e.g., power zones or chassis) to which a storage node belongs. In response to determining that certain storage nodes belong to different fault zones, the control plane may select one storage node as a primary storage node and select another storage node in a different fault zone as a secondary storage node. In the illustrated example of FIG. 4, dpu_0 and dpu_1 may be determined to belong to different fault zones. In such a case, the control plane may select the dpu_0 as a primary storage node for journal volume 418 and select dpu_1 as a secondary storage node for journal volume 418. Volume graph 400 can be configured such that leaf nodes of journal volume 418 represent the selected primary storage node and the secondary storage node. Moreover, to allocate nodes operating as storage nodes for erasure coded volume 416, the control plane may determine the fault zones to which a storage node belongs.

In some examples, the control plane may apply a load balancing rule to allocate resources based on one or more rules. The rules can be based on one or more metrics, such as IOPs usage and/or storage usage. For example, to allocate storage devices and/or storage nodes for erasure coded volume 416, the control plane may determine the IOPs usage of a given storage device and/or given storage node. The control plane may add a cost value based on the IOP usage of the given storage device and/or given storage node. The control plane may select storage devices and/or storage nodes with the lowest cost of IOPs usage for erasure coded volume 416. In some examples, storage devices and/or storage nodes with costs of IOPs usage below a certain threshold are selected. Volume graph 400 can be configured such that leaf node(s) of erasure coded volume 416 represents the selected storage device(s) and/or storage node(s). In some examples, the control plane may determine the storage usage of a given storage device and add a cost value based on the storage usage of the given storage device. The control plane may select storage devices with the lowest cost of storage usage for erasure coded volume 416. In some examples, storage devices and/or storage nodes with costs of storage usage below a certain threshold are selected. Volume graph 400 can be configured such that leaf node(s) of erasure coded volume 416 represents the selected storage device(s).

In some examples, the control plane may use volume graph 400 for event management and to rebuild volumes based on an event. Events may include a storage node going down, a storage device being pulled out, the deletion of a volume, and/or any other event associated with the allocated volume represented by volume graph 400. For example, a network device including storage device 410A may detect a failure of storage device 410A and generate an event indicating storage device 410A has failed. The event can be propagated up the layers of the volume stack of volume graph 400, such as to BLT 412, which in turn propagates the event to erasure coded volume 416. In response to erasure coded volume 416 receiving the event, the control plane may instruct the DPU to send a message to the controller (e.g., controller 200 of FIG. 2A) to inform controller 200 of the event. In response to receiving the message, graph generation module 280 may rebuild the volume graph by replacing the one or more leaf nodes of erasure coded volume 416 representing the failed storage device 410A with another storage device.

As another example, a network device including a storage node (e.g., dpu_0) may detect a failure to the storage node and generate an event indicating the storage node has failed. The event can be propagated up the layers of the volume stack of volume graph 400 to journal volume 418, which in turn propagates the event to log structured logical volume 422. In response to log structured logical volume 422 receiving the event, the control plane may instruct the DPU to send a message to the controller (e.g., controller 200 of FIG. 2A) to inform controller 200 of the event. In response to receiving the message, graph generation module 280 may rebuild the volume graph by replacing the one or more leaf nodes of log structured logical volume 422 representing the failed storage node with another storage node, e.g., by connecting journal volume 418 to a leaf node that represents another storage node having a copy of the journal.

In some examples, the control plane may use volume graph 400 to modify the volume based on changes in volume parameters. As described above, a volume can be allocated with a specified set of one or more parameters (e.g., block size, encryption keys, compression scheme, volume size, data protection scheme, etc.). For example, a volume can be allocated with a specified data protection scheme, such as erasure coding replication, none, etc. In some examples, volume parameters may be changed after creation of the volume. In these examples, new parameters are validated, and a clone of the volume can be created with the modified parameters. A clone of a volume is an independent volume but relies on the source volume for its reads until the clone of the volume is fully hydrated. As one example, the block size of erasure coded volume 416 may be increased. In this example, the control plane may create a clone of the volume with an increased block size for the erasure coded volume and may switch the host connection to the clone of the volume. In some examples, when the clone of the volume is fully hydrated, the original volume is deleted to free up space. Additional examples of snapshots and clones of volumes are described with respect to FIGS. 5 and 6 below.

In some examples, the control plane may use volume graph 400 to dynamically rebalance resources for the volume. For example, storage devices and/or storage nodes allocated for durable volumes may generate alerts based on metrics associated with the resources allocated for the volume reaching certain thresholds. Metrics may include storage usage, IOPs usage, health of the storage devices, bandwidth of the storage nodes, etc. The control plane may rebalance the load to the resources based on the alerts. As one example, the bandwidth of a storage node operating as the primary storage node (e.g., dpu_0) may exceed a bandwidth threshold. In response, the storage node may generate an alert that is propagated up the layers of the volume stack of volume graph 400 to journal volume 418, and in response, the control plane may move the load from the storage node operating as the primary storage node to a different storage node and rebuild the leaf node of journal volume 418 with the different storage node. In another example, the storage usage of a storage device may exceed a storage usage threshold and may generate an alert that is propagated up the layers of the volume stack of volume graph 400 to erasure coded volume 416, and in response, the control plane may move the load from storage device to a different storage device and rebuild the leaf node of erasure coded volume 416 with the different storage device. In some examples, the system may use machine learning algorithms to predict the usage by resources over time and determine whether to rebalance resources based not only on the current usage but also on predicted future usage of the resources.

In some examples, the control plane may use volume graph 400 to rebalance resources when storage devices and/or storage nodes are added or removed from the system. For example, the control plane may determine, in response to the addition of a storage device, the storage usage of the storage devices. For instance, the control plane may determine whether there are storage devices that have a low usage (e.g., less than 20% storage usage), a medium usage (e.g., greater than 50% storage usage), or a high usage (e.g., greater than 80% storage usage). The data of the storage devices with the highest usage may be relocated.

In some examples, the control plane may determine the extent from the storage device to relocate by computing a ratio of physical usage to allocated space (e.g., extent assigned) from the storage device (r1), computing a ratio of allocated space (e.g., extent assigned) to the physical size of the storage device (r2), multiplying r1 and r2, and selecting the extent from the storage device with the highest value to relocate. As one example, a storage device may have a physical capacity of 900 GB. This provisioning may be enabled as 200% and a total of 14 extents are sitting on the storage device. For instance, 4 extents with 400 GB are allocated on the storage device and 10 extents with 10 GB are allocated on the storage device. Assume, for example, input and output are occurring on two extents with 400 GB, and these two extents are using 600 GB in total. The first extent may occupy 100% of its allocated storage space and the second extent may occupy 50% of its allocated storage space. Assume also that input and output are occurring on 4 extents with 10 GB size, and three of these extents may occupy 100% of their allocated storage space while one extent may occupy 50% of its allocated storage space. The control plane may arrange the usage of the extents in a list (e.g., [400, 400, 400, 400, 10, 10, 10, 10, 10, 10, 10, 10, 10, 10]) and computes a ratio of the physical usage of each of the extents (r1) (e.g., [1.0, 0.5, 0, 0, 1.0, 1.0, 1.0, 0.5, 0. 0. 0. 0. 0]). The control plane may multiply r1 with the ratio of allocated space to the physical size of the storage device (r2) (e.g., [0.44, 0.22, 0, 0, 0.01, 0.01, 0.005, 0, 0, 0, 0, 0]), where, for a 400 GB extent, r2 is 400/900=0.44. In this example, the extent with the highest value (e.g., 0.44) may be selected for relocation.

In some examples, the control plane may use volume graph 400 to rebalance storage nodes when a new storage node is added (or recommissioned). For example, the control plane may determine, in response to the addition of a new storage node, the bandwidth usage (or other QoS requirement) of storage nodes and, if the bandwidth usage of any of the storage nodes has exceeded a bandwidth usage threshold, the control plane may move the log structured logical volume mapped to the storage node having bandwidth usage that exceeded the bandwidth usage threshold to the new storage node. In some examples, volumes that are not mounted because of non-availability of volatile memory (e.g., Double Data Rate (DDR) memory) may be mounted on the newly added storage nodes.

In some examples, the control plane may use volume graph 400 to rebalance volumes when failed storage nodes come back online. For example, when a storage node operating as a primary storage node (e.g., dpu_0) fails or is degraded (or is otherwise unavailable), the durable volumes on the storage node can be moved to a secondary storage node (e.g., dpu_1). When the original primary storage node (dpu_0) comes back online, the control plane may use volume graph 400 to rebalance the durable volumes back to the original primary storage node, such as by resynchronizing NVM 420A with a copy of the journal, configuring the old primary storage node (e.g., dpu_0) as a new secondary storage node, resynchronizing the leaf nodes of the new backup controller node, changing the log structured logical volume 422 to an online state, unmapping the log structured logical volume 422 from the current primary storage node (e.g., dpu_1), and mapping the log structured logical volume 422 to the new secondary controller node. The partitioned volume group 424, user groups 426, and/or snapshots can then be mapped to the log structured logical volume 422.

In some examples, the control plane may use volume graph 400 to monitor volumes that are in the process of being deleted, and a storage service or operating system executed on a storage node (e.g., as micro-service) is restarted. In the event the storage service is restarted, the control plane may determine whether there are any volume (s) that were marked in a database, including the state of a volume as in the process of being deleted, and whether the volume has been deleted in the operating system. If the volume is deleted in the operating system, the control plane may remove the volume from the database. If the volume has not been deleted in the operating system, the control plane may revert back the deletion process (e.g., revert back the deletion in progress flag in the database).

Figure 5:
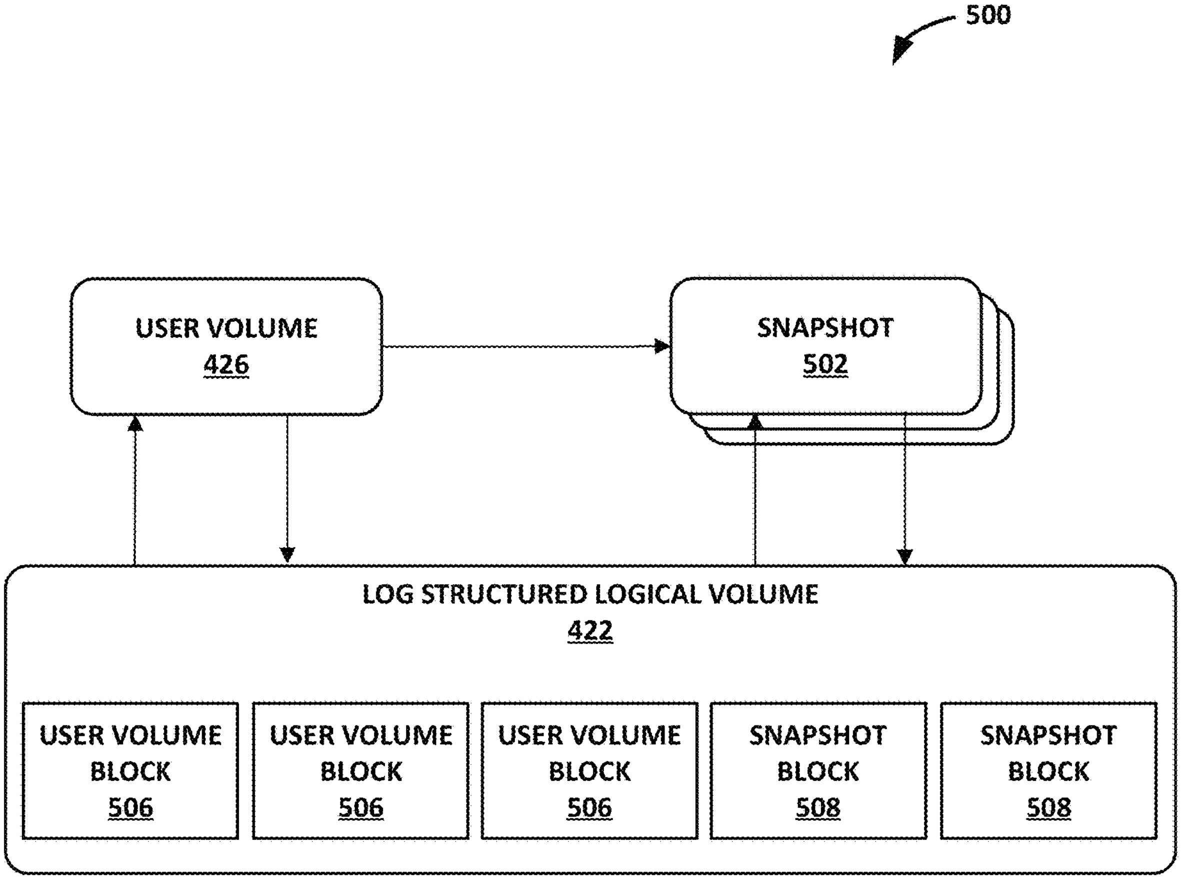
FIG. 5 illustrates an example graph-based representation of snapshots of a volume, in accordance with the techniques described in this disclosure.

FIG. 5 illustrates an example graph-based representation of snapshots of a volume, in accordance with the techniques described in this disclosure. Graph 500 may represent an example implementation of snapshots of user volume 426 of FIG. 4. In the example of FIG. 5, user volume 426 may be associated with one or more snapshots. A snapshot of user volume 426 (e.g., snapshot 502) may include content of user volume 426 at a given point in time. User volume 426 may have multiple snapshots. In some examples, snapshot 502 of user volume 426 is contained within log structured logical volume 422 as a snapshot block (e.g., snapshot block 508) in addition to user volume blocks 506. As described below, a clone of a user volume may be created from snapshots 502.

Figure 6:
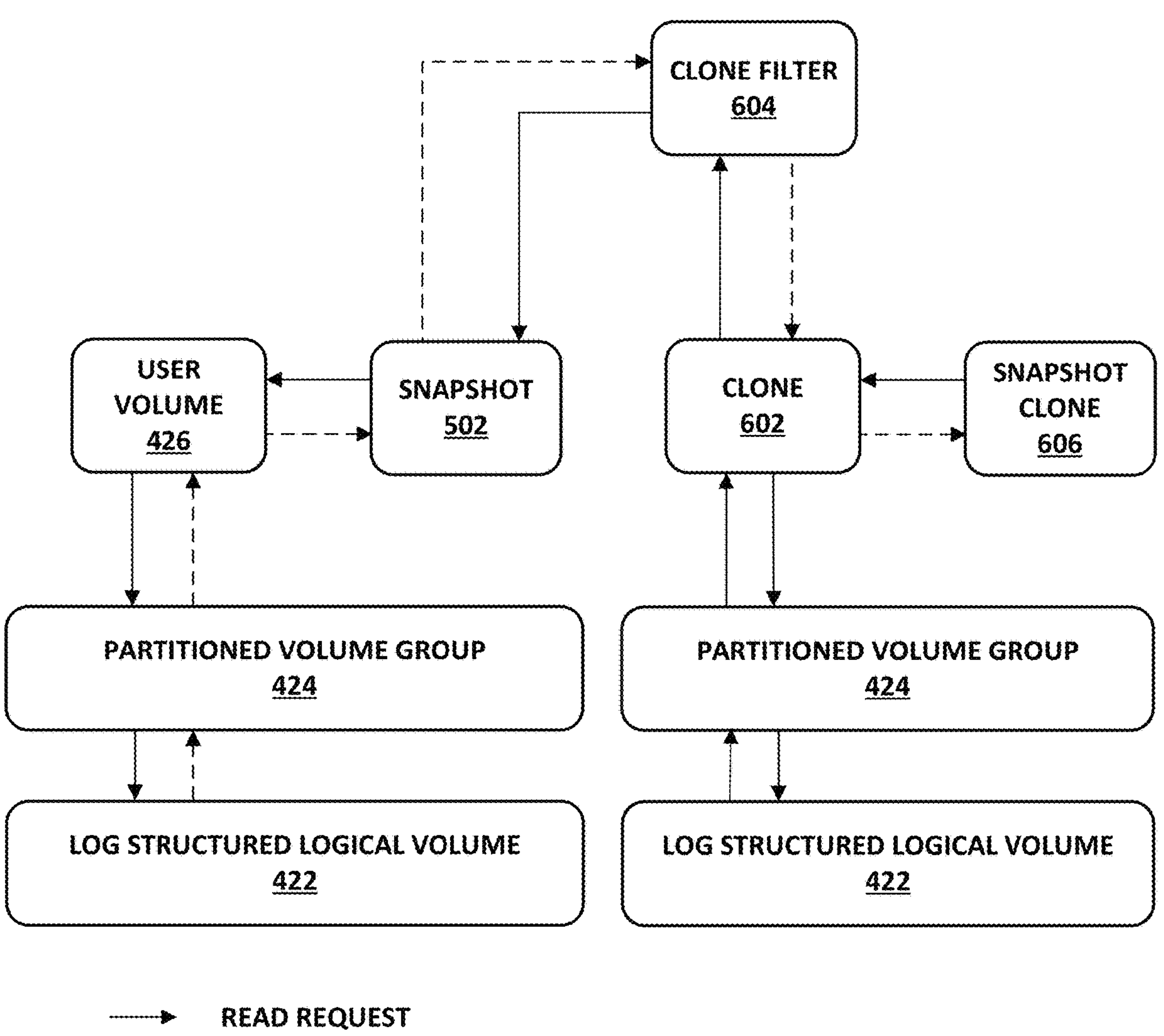
FIG. 6 is a block diagram illustrating an example interaction of volume with a clone of a user volume for read and write operations, in accordance with the techniques described in this disclosure.

FIG. 6 is a block diagram illustrating an example interaction of a volume with a clone of a user volume for read and write operations, in accordance with the techniques described in this disclosure. In the example of FIG. 6, snapshot 502 may include content of user volume 426 at a given point in time. Clone 602 may represent a clone of user volume 426 that is created from snapshot 502. Clone 602 of user volume 426 is an independent volume, but relies on the source volume (e.g., user volume 426) for its reads until clone 602 of user volume 426 is fully hydrated. In this example, clone filter 604 is used for conditional reads.

As described above, clone 602 may be used to switch a host connection (e.g., user volume 426) to a volume that has been modified with different volume parameters. In these examples, new parameters are validated and a clone of user volume 426 is created with the modified parameters (e.g., clone 602). In this example, the host connection is switched to clone 602 when clone 602 is fully hydrated. In some examples, when the clone of the volume is fully hydrated, the original volume is deleted to free up space. In some examples, a snapshot of clone 602 (e.g., snapshot clone 606) may include content of clone 602 at a given point in time.

Figure 7A:
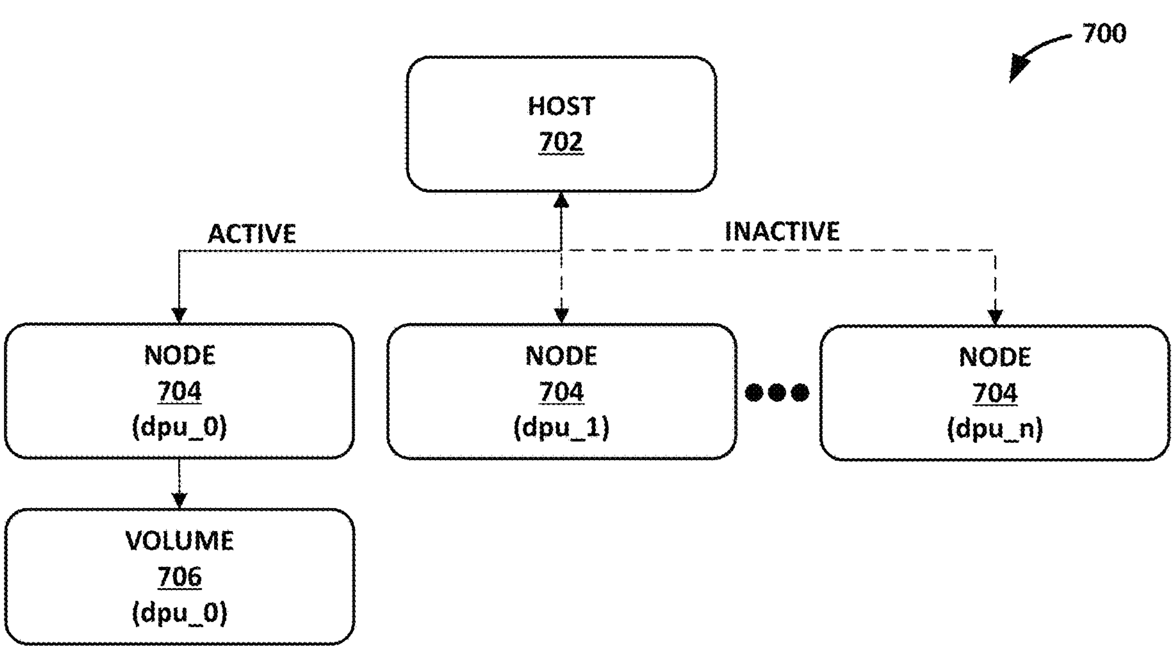
FIGS. 7A-7B are block diagrams illustrating an example failover operation using a volume graph, in accordance with the techniques described in this disclosure.
Figure 7B:
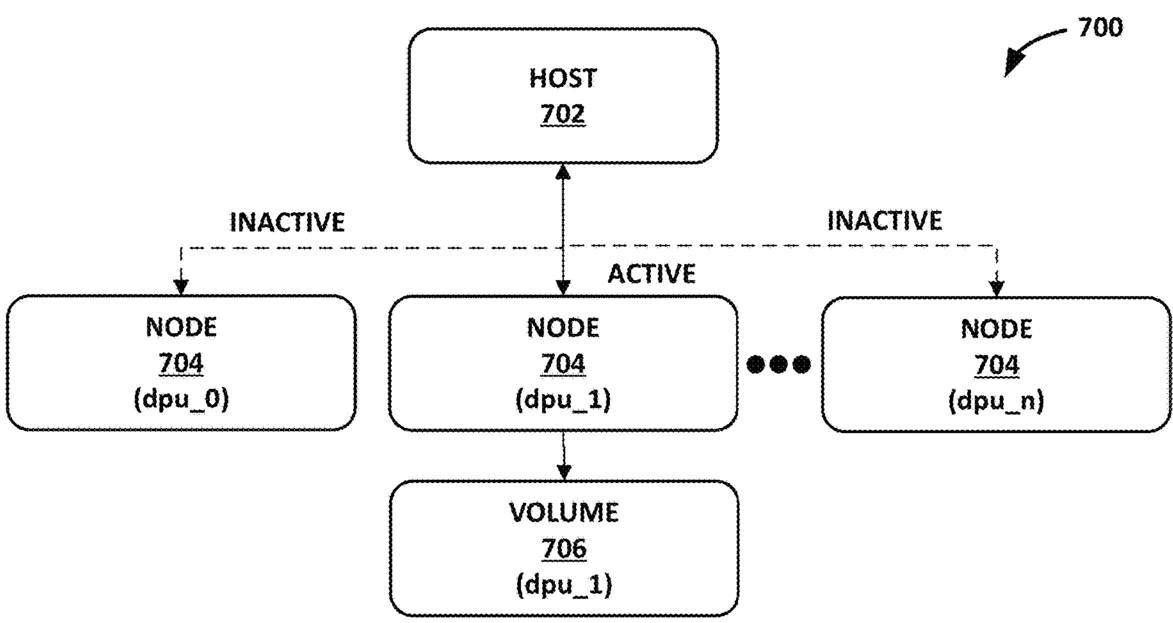

FIGS. 7A-7B are block diagrams illustrating an example failover operation using a volume graph, in accordance with the techniques described in this disclosure. For ease of illustration, FIGS. 7A-7B are described with respect to volume graph 400 of FIG. 4.

FIG. 7A illustrates an example in which host 702 has access to volume 706 via a connection to a storage node 704 operating as a primary storage node (e.g., dpu_0) and connections to one or more storage nodes 704 operating as secondary storage nodes (e.g., dpu_1 through dpu_n). In some examples, the primary storage node and secondary storage nodes may be selected from among nodes having a copy of the journal (e.g., nodes associated with journal volume 418 of FIG. 4). The selection of which node to operate as a primary storage node may depend on one or more metrics, such as bandwidth of the node, how many volumes are accessed by the node, etc. For example, the control plane may select dpu_0 to operate as the primary storage node to access volume 706 based on a determination that dpu_0 has the most amount of available bandwidth and/or has the least amount of accessed volumes.

Access to volume 706 via the one or more secondary storage nodes can be inactive until the primary storage node fails. In response to a failure of the primary storage node, the control plane may reconstruct the volume graph to enable failover to a secondary storage node, as further described and illustrated in FIG. 7B. In the example of FIG. 7B, the control plane reconstructs volume graph 700 by connecting host 702 to a secondary storage node (e.g., dpu_1), which may provide host 702 with access to volume 706.

Figure 8:
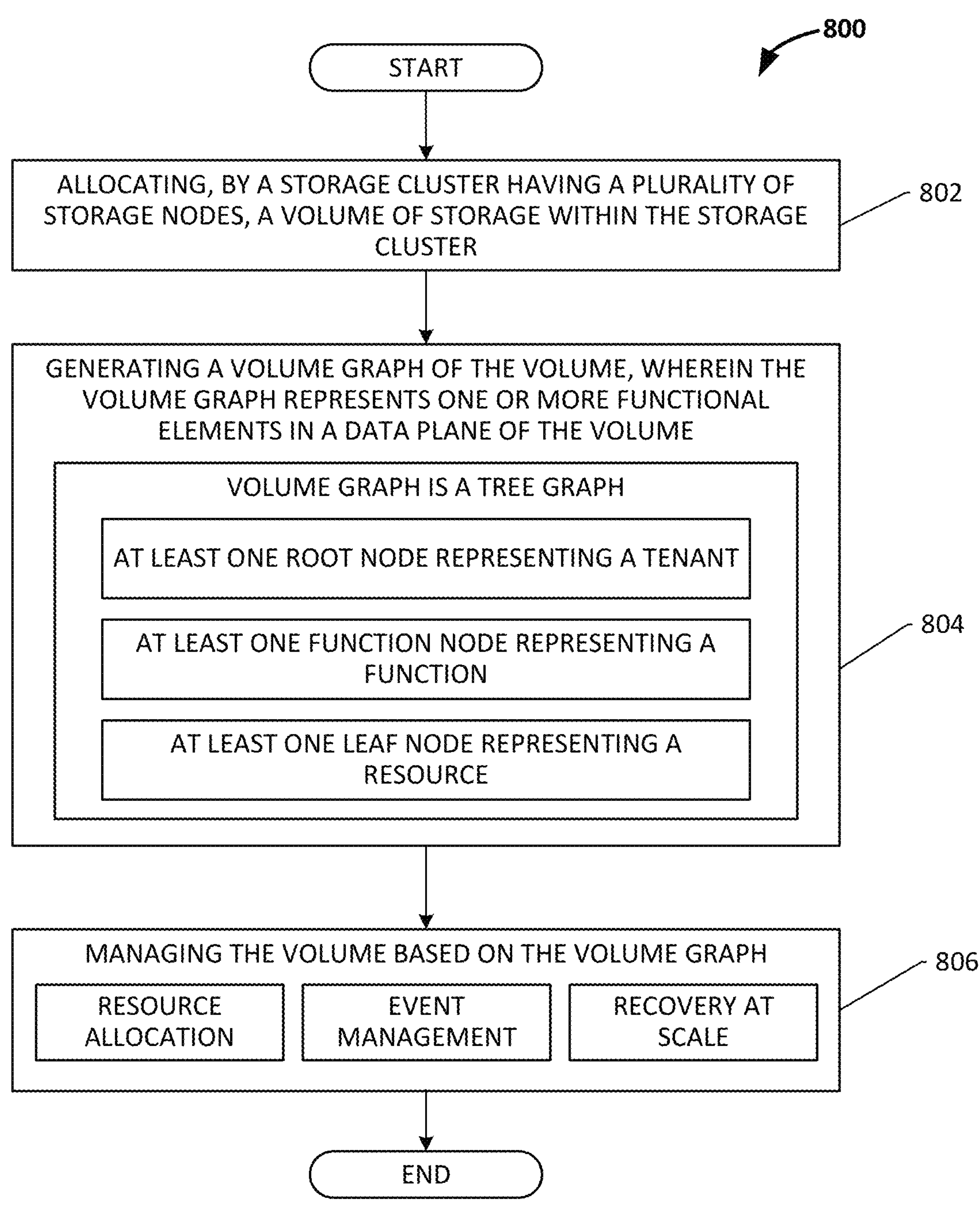
FIG. 8 is a flow diagram of an example method for graph-based storage management, in accordance with the techniques described in this disclosure.

FIG. 8 is a flow diagram of an example method for graph-based storage management, in accordance with the techniques described in this disclosure. At step 802, the method 800 includes allocating a volume of storage within a storage cluster. In some examples. A volume represents a logical storage device and provides a level of abstraction from physical storage. The volume can be allocated by a storage cluster having a plurality of storage nodes. Resources for the volume can be allocated based on various rules. In some examples, one or more resources can be allocated for the volume based on one or more metrics associated with the one or more resources. Example metrics include input and output operations per second (IOPs) capacity, storage capacity, fault/failure domains, IOPs usage, or storage usage.

At step 804, the method 800 includes generating a volume graph of the volume. The volume graph can be generated using various methods, including the use of a graph generation module. The volume graph represents one or more functional elements in a data plane of the volume. The volume graph can be configured in various ways. For example, the volume graph can include a tree graph. In some examples, the volume graph includes at least one root node representing at least one tenant of the storage cluster. The volume graph can include one or more function nodes, or intermediate nodes, each specifying a function implemented by one or more resources allocated for the volume. The volume graph can include one or more leaf nodes, each specifying a resource allocated for a given function.

At step 806, the method 800 includes managing the volume based on the volume graph. Managing the volume can include performing various tasks, such as tasks for resource allocation, event management, and recovery at scale (e.g., failover) for the volume. Managing the volume can include modifying a function node with a different function node. For example, a function node can be replaced by a different function node that specifies a different function. In some examples, managing the volume includes modifying a leaf node with a different leaf node. For example, a leaf node specifying a first resource for a function can be replaced with a different leaf node that specifies a different resource for said function. In some examples, managing the volume includes dynamically rebalancing one or more resources allocated for the volume based on one or more modified metrics associated with one or more resources allocated for the volume. In some examples, managing the volume includes receiving an event associated with one or more leaf nodes. Based on the event, various actions can be performed. For example, an event can result in allocating a different resource for a given function by replacing a leaf node with a different leaf node that represents the different resource. In some examples, managing the volume includes determining that one or more parameters of the volume have changed. For example, one or more resources for a volume can be allocated based on one or more parameters of the volume. Examples of such parameters include block size, encryption keys, compression scheme, volume size, data protection scheme, etc. After determining that the one or more parameters of the volume have changed, a clone of the volume can be generated based on the parameter(s) that changed.

The following paragraphs provide additional support for the claims of the subject application. One aspect provides a method for graph-based storage management, the method comprising: allocating, by a storage cluster having a plurality of storage nodes, a volume of storage within the storage cluster; generating a volume graph of the volume, wherein the volume graph represents one or more functional elements in a data plane of the volume; and managing the volume based on the volume graph. In this aspect, additionally or alternatively, the volume graph of the volume comprises a tree graph, the tree graph comprising: a function node that specifies a function implemented by one or more resources allocated for the volume; and one or more leaf nodes to the function node, wherein the one or more leaf nodes each specifies a resource of the one or more resources allocated for the function. In this aspect, additionally or alternatively, the tree graph further comprises a root node representing at least one tenant of the storage cluster. In this aspect, additionally or alternatively, managing the volume based on the volume graph comprises modifying the function node with a second function node that specifies a second function. In this aspect, additionally or alternatively, the one or more leaf nodes comprise a first leaf node that specifies a first resource for the function, and wherein managing the volume based on the volume graph comprises modifying the first leaf node that specifies the first resource for the function with a second leaf node that specifies a second resource for the function. In this aspect, additionally or alternatively, the one or more resources for the volume were allocated based on application of one or more rules to the one or more leaf nodes, wherein the one or more rules comprise one or more of resource availability rule, data protection rule, or load balancing rule. In this aspect, additionally or alternatively, managing the volume based on the volume graph comprises dynamically rebalancing the one or more resources allocated for the volume based on one or more modified metrics associated with the one or more resources allocated for the volume. In this aspect, additionally or alternatively, managing the volume based on the volume graph comprises: receiving, by the function node, an event associated with the one or more leaf nodes to the function node; and allocating a different resource for the function by replacing the one or more leaf nodes to the function node with a leaf node that represents the different resource for the function. In this aspect, additionally or alternatively, the one or more resources allocated for the volume are allocated based on one or more parameters of the volume, and wherein managing the volume based on the volume graph comprises: determining that the one or more parameters of the volume have changed; and generating a clone of the volume based on the one or more parameters that have changed. In this aspect, additionally or alternatively, the one or more parameters comprise one or more of block size, encryption keys, compression scheme, volume size, or data protection scheme.

Another aspect provides a computing system for graph-based storage management, the computing system comprising: a network interface for interconnecting the computing system with at least one other computing system to form a plurality of computing systems over a network; and at least one storage node, wherein the at least one storage node is part of a storage cluster formed by the plurality of computing systems, and wherein the computing system is configured to: allocate a volume of storage within the storage cluster; generate a volume graph of the volume, wherein the volume graph represents one or more functional elements in a data plane of the volume; and manage the volume based on the volume graph. In this aspect, additionally or alternatively, the volume graph of the volume comprises a tree graph, the tree graph comprising: a function node that specifies a function implemented by one or more resources allocated for the volume; and one or more leaf nodes to the function node, wherein the one or more leaf nodes each specifies a resource of the one or more resources allocated for the function. In this aspect, additionally or alternatively, managing the volume based on the volume graph comprises modifying the function node with a second function node that specifies a second function. In this aspect, additionally or alternatively, the one or more leaf nodes comprise a first leaf node that specifies a first resource for the function, and wherein to manage the volume based on the volume graph, the computing system is further configured to modify the first leaf node that specifies the first resource for the function with a second leaf node that specifies a second resource for the function. In this aspect, additionally or alternatively, the one or more resources for the volume were allocated based on application of one or more rules to the one or more leaf nodes, wherein the one or more rules comprise one or more of resource availability rule, data protection rule, or load balancing rule.

Another aspect provides a computer-readable storage medium for graph-based storage management, the computer-readable storage medium comprising instructions that, when executed, cause one or more processors to: allocate a volume of storage within a storage cluster; generate a volume graph of the volume, wherein the volume graph represents one or more functional elements in a data plane of the volume; and manage the volume based on the volume graph. In this aspect, additionally or alternatively, the volume graph of the volume comprises a tree graph, the tree graph comprising: a function node that specifies a function implemented by one or more resources allocated for the volume; and one or more leaf nodes to the function node, wherein the one or more leaf nodes each specifies a resource of the one or more resources allocated for the function. In this aspect, additionally or alternatively, managing the volume based on the volume graph comprises modifying the function node with a second function node that specifies a second function. In this aspect, additionally or alternatively, the one or more leaf nodes comprise a first leaf node that specifies a first resource for the function, and wherein to manage the volume based on the volume graph, the computing system is further configured to modify the first leaf node that specifies the first resource for the function with a second leaf node that specifies a second resource for the function. In this aspect, additionally or alternatively, the one or more resources for the volume were allocated based on application of one or more rules to the one or more leaf nodes, wherein the one or more rules comprise one or more of resource availability rule, data protection rule, or load balancing rule.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are each hereby incorporated by reference in their entireties for all purposes. To the extent that any such disclosure material that is incorporated by reference conflicts with the instant disclosure, the instant disclosure shall control.

For ease of illustration, only a limited number of devices (e.g., initiator nodes 110, storage nodes 120, controllers 130, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other examples or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for graph-based storage management, the method comprising:

allocating, by a storage cluster having a plurality of storage nodes, a volume of storage within the storage cluster;

generating a volume graph of the volume, wherein the volume graph represents one or more functional elements in a data plane of the volume;

managing the volume based on the volume graph, wherein the volume graph of the volume includes a tree graph comprising:

a root node representing one or more host servers associated with the volume;

a function node that specifies a function implemented by one or more resources allocated for the volume, wherein the function comprises a data durability scheme; and one or more leaf nodes to the function node, wherein the one or more leaf nodes each specifies a resource of the one or more resources allocated for the function, and wherein the one or more resources comprise one or more of the plurality of storage nodes;

detecting failure of a storage node of the one or more of the plurality of storage nodes by:

generating an event indicating the failure of the storage node; and propagating the event through layers of the volume graph; and based on the propagated event, instructing a controller to perform reconstruction of the volume graph to enable failover to another storage node of the plurality of storage nodes.

2. The method of claim 1, wherein the root node represents at least one tenant of the storage cluster.

3. The method of claim 1, wherein managing the volume based on the volume graph comprises modifying the function node with a second function node that specifies a second function.

4. The method of claim 1, wherein the one or more leaf nodes comprise a first leaf node that specifies a first resource for the function, and wherein managing the volume based on the volume graph comprises modifying the first leaf node that specifies the first resource for the function with a second leaf node that specifies a second resource for the function.

5. The method of claim 1, wherein the one or more resources for the volume were allocated based on application of one or more rules to the one or more leaf nodes, wherein the one or more rules comprise one or more of resource availability rule, data protection rule, or load balancing rule.

6. The method of claim 5, wherein managing the volume based on the volume graph comprises dynamically rebalancing the one or more resources allocated for the volume based on one or more modified metrics associated with the one or more resources allocated for the volume.

7. The method of claim 1, wherein managing the volume based on the volume graph comprises:

receiving, by the function node, an event associated with the one or more leaf nodes to the function node; and allocating a different resource for the function by replacing the one or more leaf nodes to the function node with a leaf node that represents the different resource for the function.

8. The method of claim 1, wherein the one or more resources allocated for the volume are allocated based on one or more parameters of the volume, and wherein managing the volume based on the volume graph comprises:

determining that the one or more parameters of the volume have changed; and generating a clone of the volume based on the one or more parameters that have changed.

9. The method of claim 8, wherein the one or more parameters comprise one or more of block size, encryption keys, compression scheme, volume size, or data protection scheme.

10. A computing system for graph-based storage management, the computing system comprising:

a network interface for interconnecting the computing system with at least one other computing system to form a plurality of computing systems over a network; and at least one storage node, wherein the at least one storage node is part of a plurality of storage nodes of a storage cluster formed by the plurality of computing systems, and wherein the computing system is configured to:

allocate a volume of storage within the storage cluster;

generate a volume graph of the volume, wherein the volume graph represents one or more functional elements in a data plane of the volume;

manage the volume based on the volume graph, wherein the volume graph of the volume includes a tree graph comprising:

a root node representing one or more host servers associated with the volume;

a function node that specifies a function implemented by one or more resources allocated for the volume, wherein the function comprises a data durability scheme; and one or more leaf nodes to the function node, wherein the one or more leaf nodes each specifies a resource of the one or more resources allocated for the function, and wherein the one or more resources comprise one or more of the plurality of storage nodes;

detecting failure of a storage node of the one or more of the plurality of storage nodes by:

generating an event indicating the failure of the storage node; and propagating the event through layers of the volume graph; and based on the propagated event, instructing a controller to perform reconstruction of the volume graph to enable failover to another storage node of the plurality of storage nodes.

11. The computing system of claim 10, wherein managing the volume based on the volume graph comprises modifying the function node with a second function node that specifies a second function.

12. The computing system of claim 10, wherein the one or more leaf nodes comprise a first leaf node that specifies a first resource for the function, and wherein to manage the volume based on the volume graph, the computing system is further configured to modify the first leaf node that specifies the first resource for the function with a second leaf node that specifies a second resource for the function.

13. The computing system of claim 10, wherein the one or more resources for the volume were allocated based on application of one or more rules to the one or more leaf nodes, wherein the one or more rules comprise one or more of resource availability rule, data protection rule, or load balancing rule.

14. A computer-readable storage medium for graph-based storage management, the computer-readable storage medium comprising instructions that, when executed, cause one or more processors to:

allocate a volume of storage within a storage cluster;

generate a volume graph of the volume, wherein the volume graph represents one or more functional elements in a data plane of the volume;

manage the volume based on the volume graph, wherein the volume graph of the volume includes a tree graph comprising:

a root node representing one or more host servers associated with the volume;

a function node that specifies a function implemented by one or more resources allocated for the volume, wherein the function comprises a data durability scheme; and one or more leaf nodes to the function node, wherein the one or more leaf nodes each specifies a resource of the one or more resources allocated for the function, and wherein the one or more resources comprise one or more of a plurality of storage nodes;

detecting failure of a storage node of the one or more of the plurality of storage nodes by:

generating an event indicating the failure of the storage node; and propagating the event through layers of the volume graph; and based on the propagated event, instructing a controller to perform reconstruction of the volume graph to enable failover to another storage node of the plurality of storage nodes.

15. The computer-readable storage medium of claim 14, wherein managing the volume based on the volume graph comprises modifying the function node with a second function node that specifies a second function.

16. The computer-readable storage medium of claim 14, wherein the one or more leaf nodes comprise a first leaf node that specifies a first resource for the function, and wherein to manage the volume based on the volume graph, the computing system is further configured to modify the first leaf node that specifies the first resource for the function with a second leaf node that specifies a second resource for the function.

17. The computer-readable storage medium of claim 14, wherein the one or more resources for the volume were allocated based on application of one or more rules to the one or more leaf nodes, wherein the one or more rules comprise one or more of resource availability rule, data protection rule, or load balancing rule.

* * * * *